July 15, 1947.   F. E. HAMILTON ET AL   2,424,091
RECORD CONTROLLED DIVIDING MACHINE
Filed Dec. 9, 1944   26 Sheets-Sheet 6
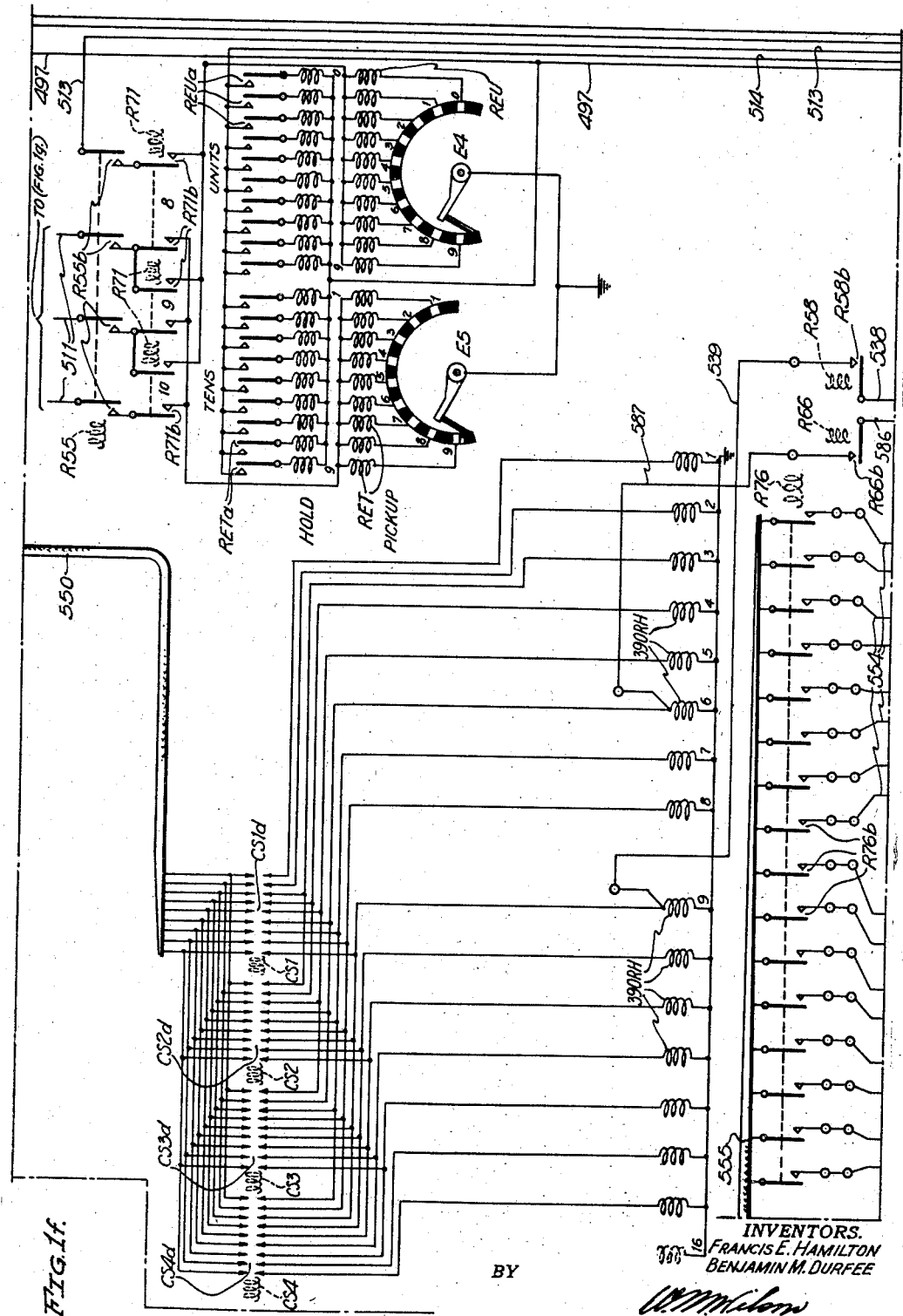
INVENTORS.
FRANCIS E. HAMILTON
BENJAMIN M. DURFEE
BY
ATTORNEY.

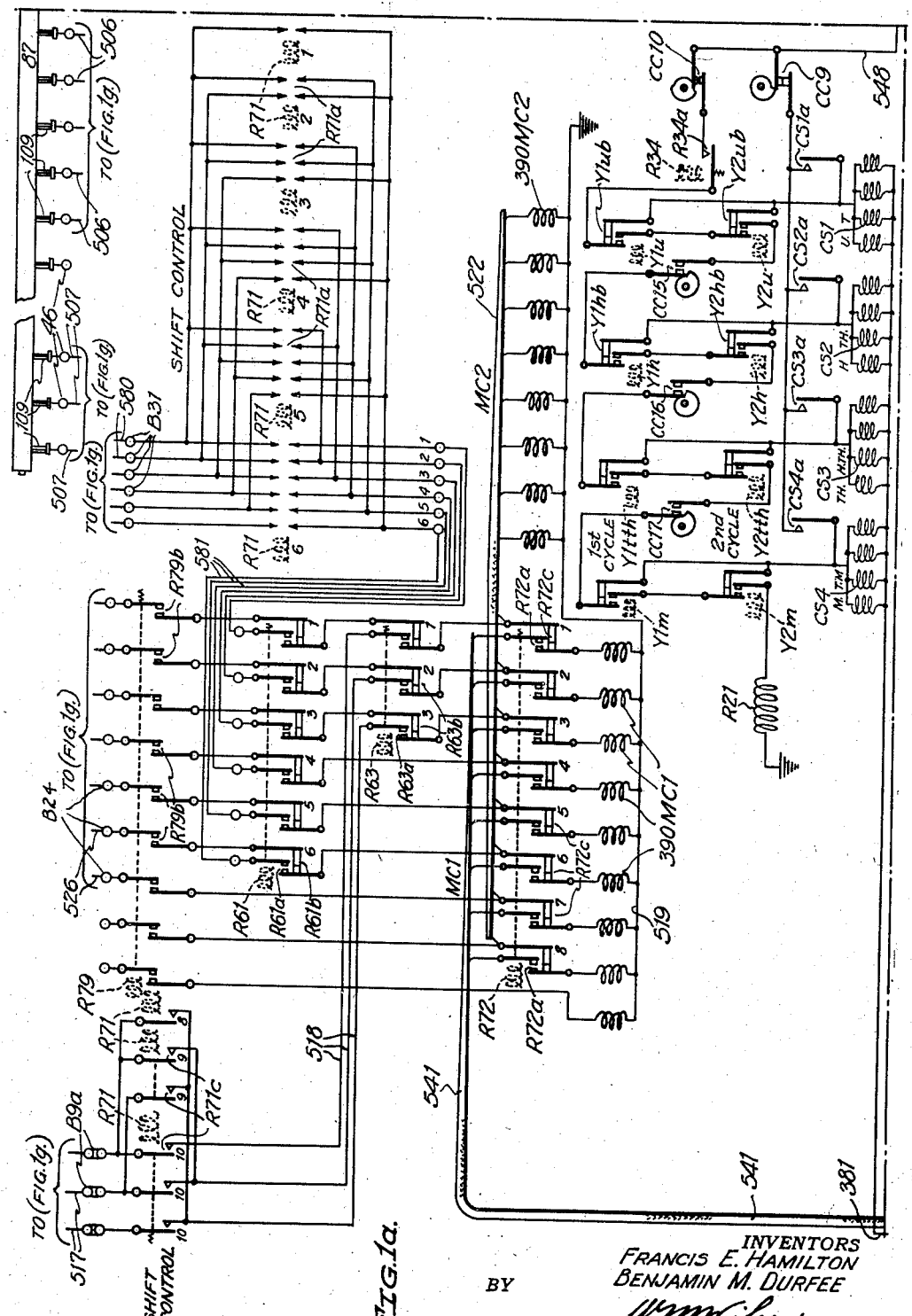

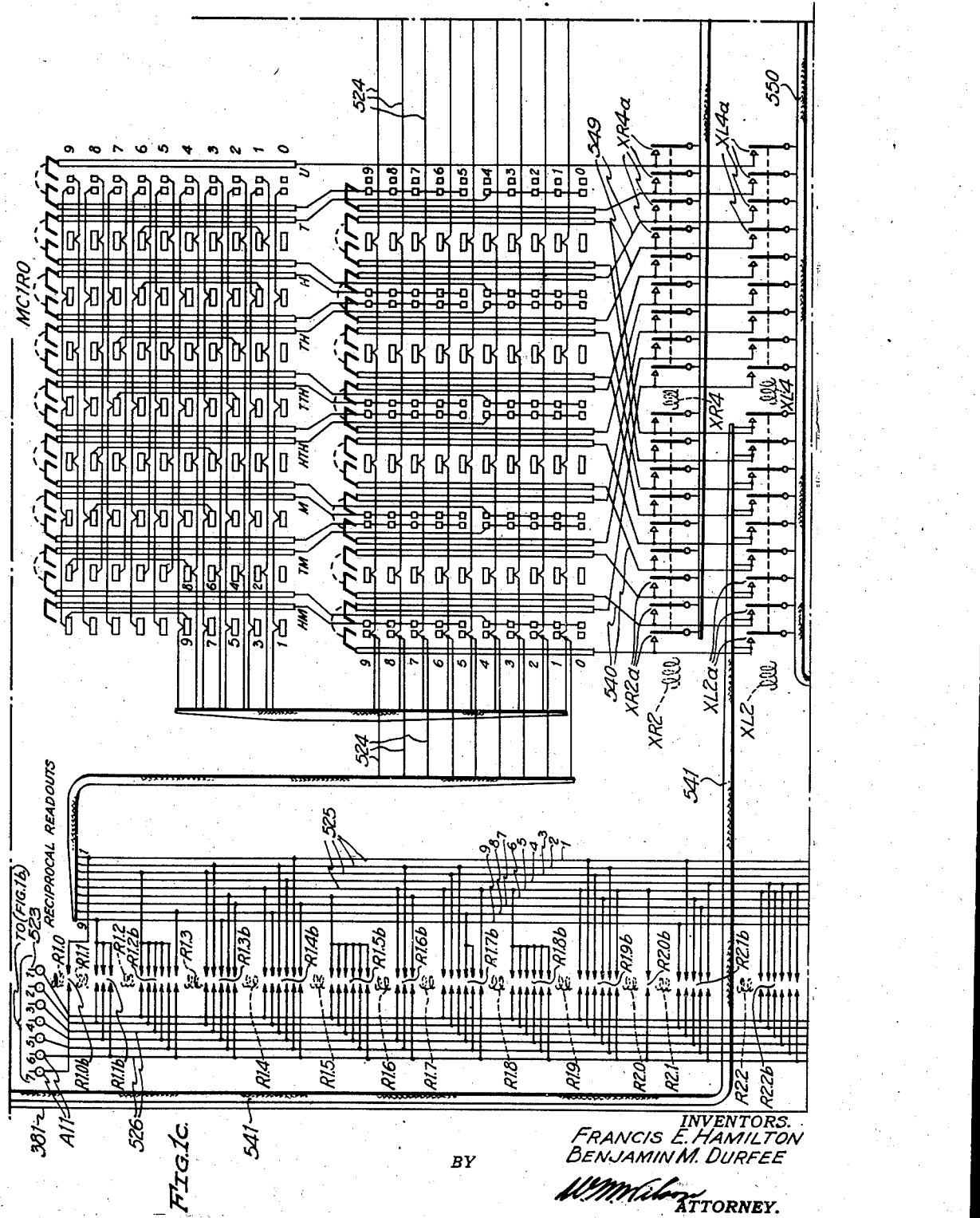

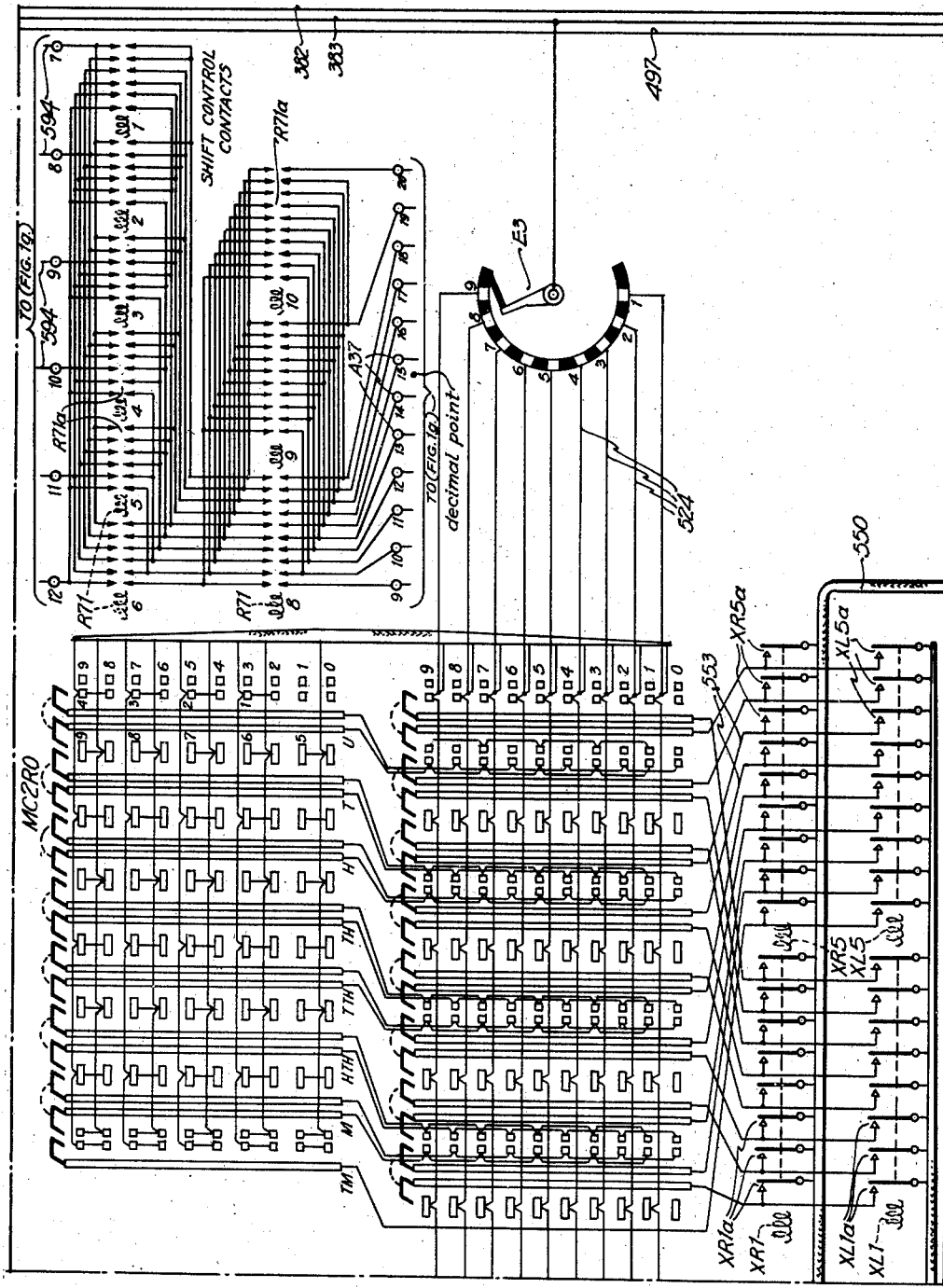

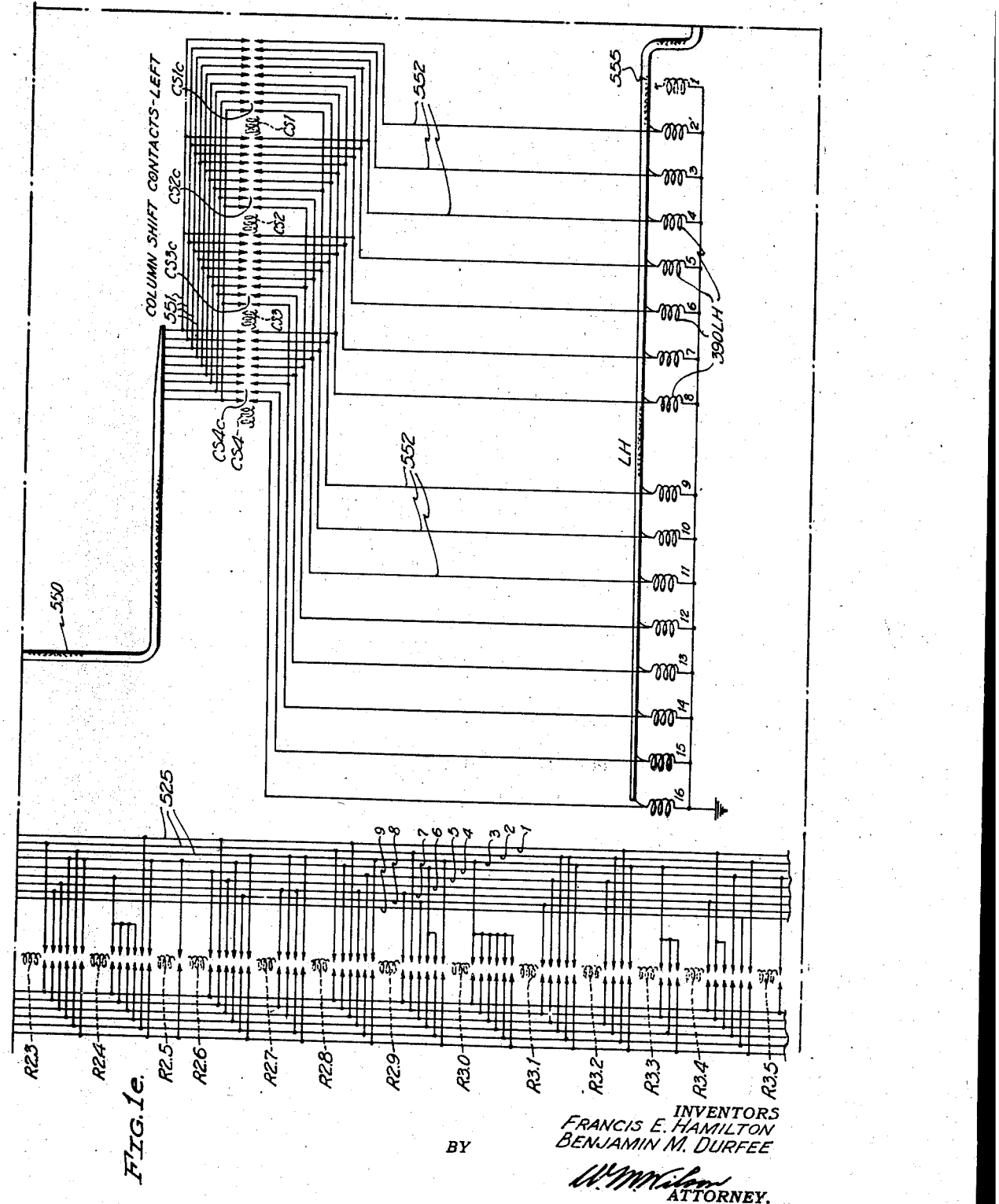

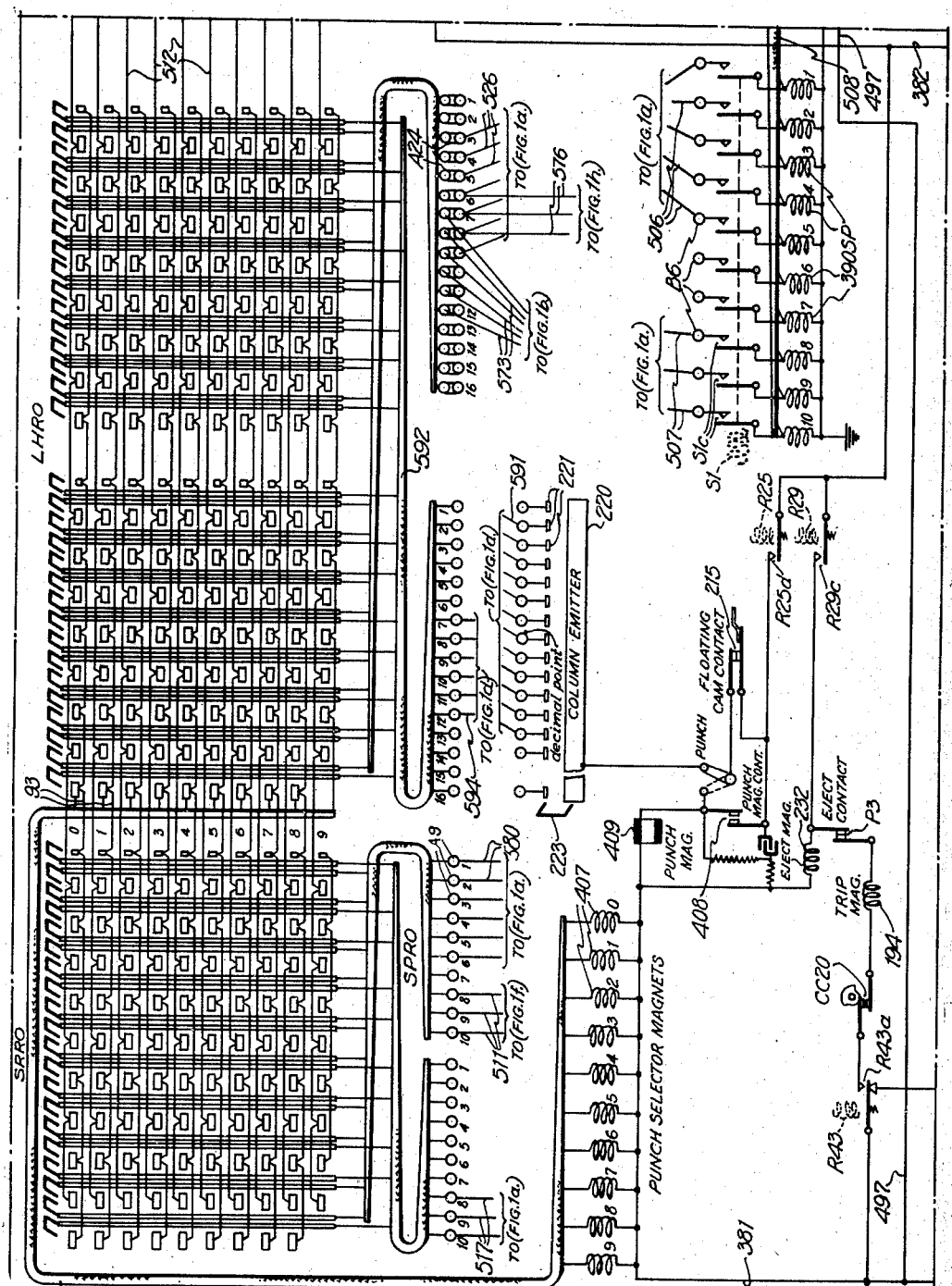

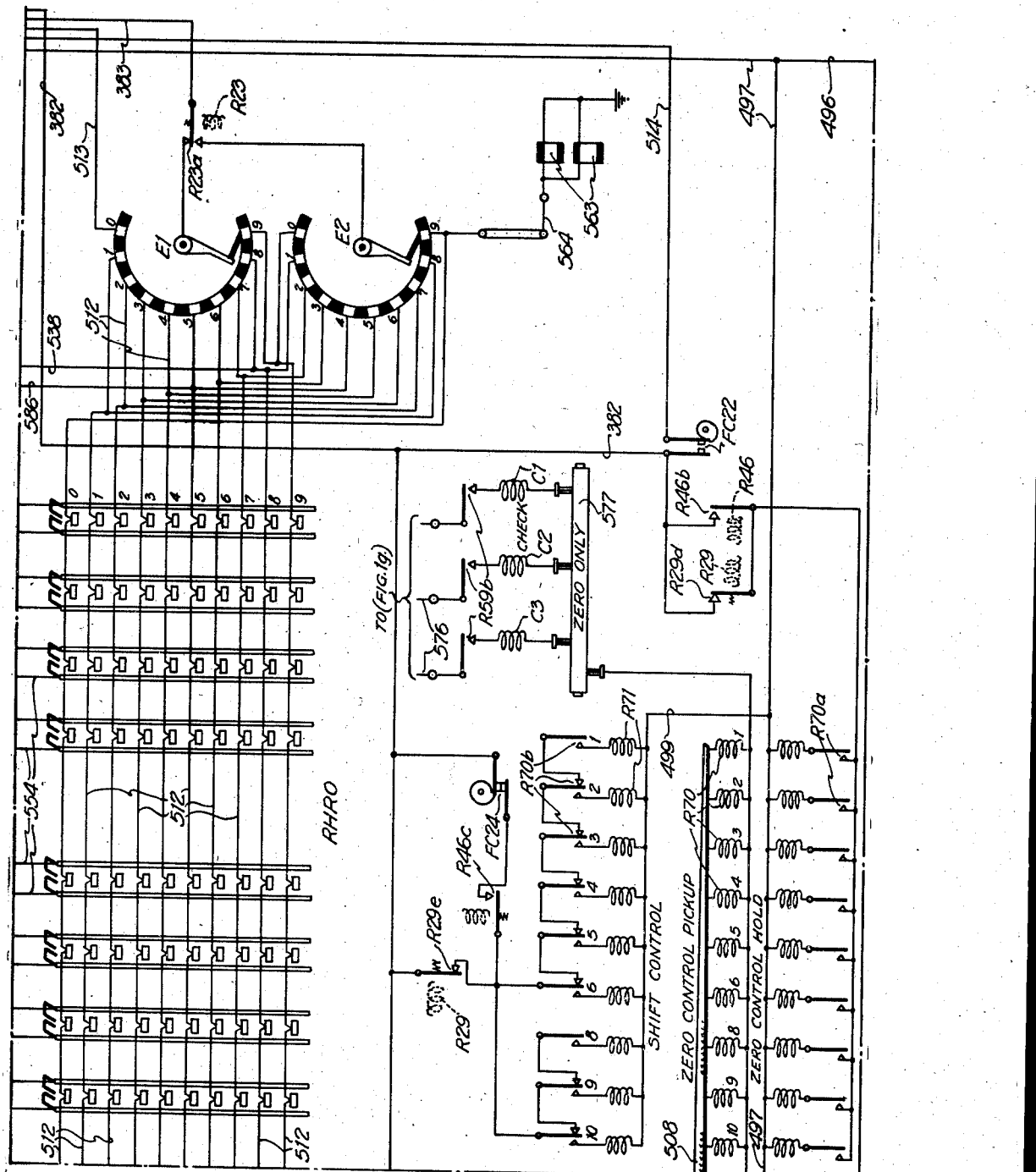

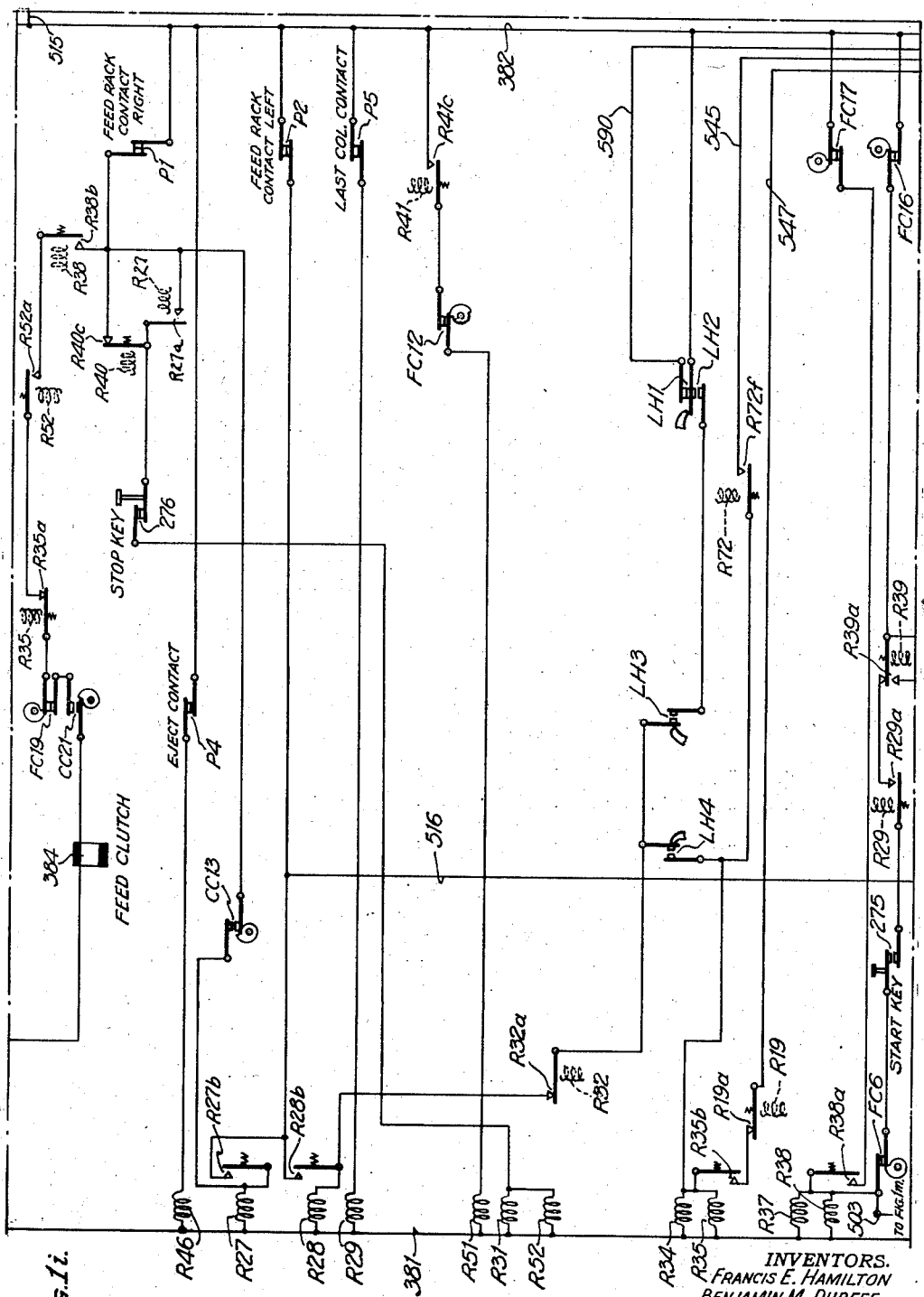

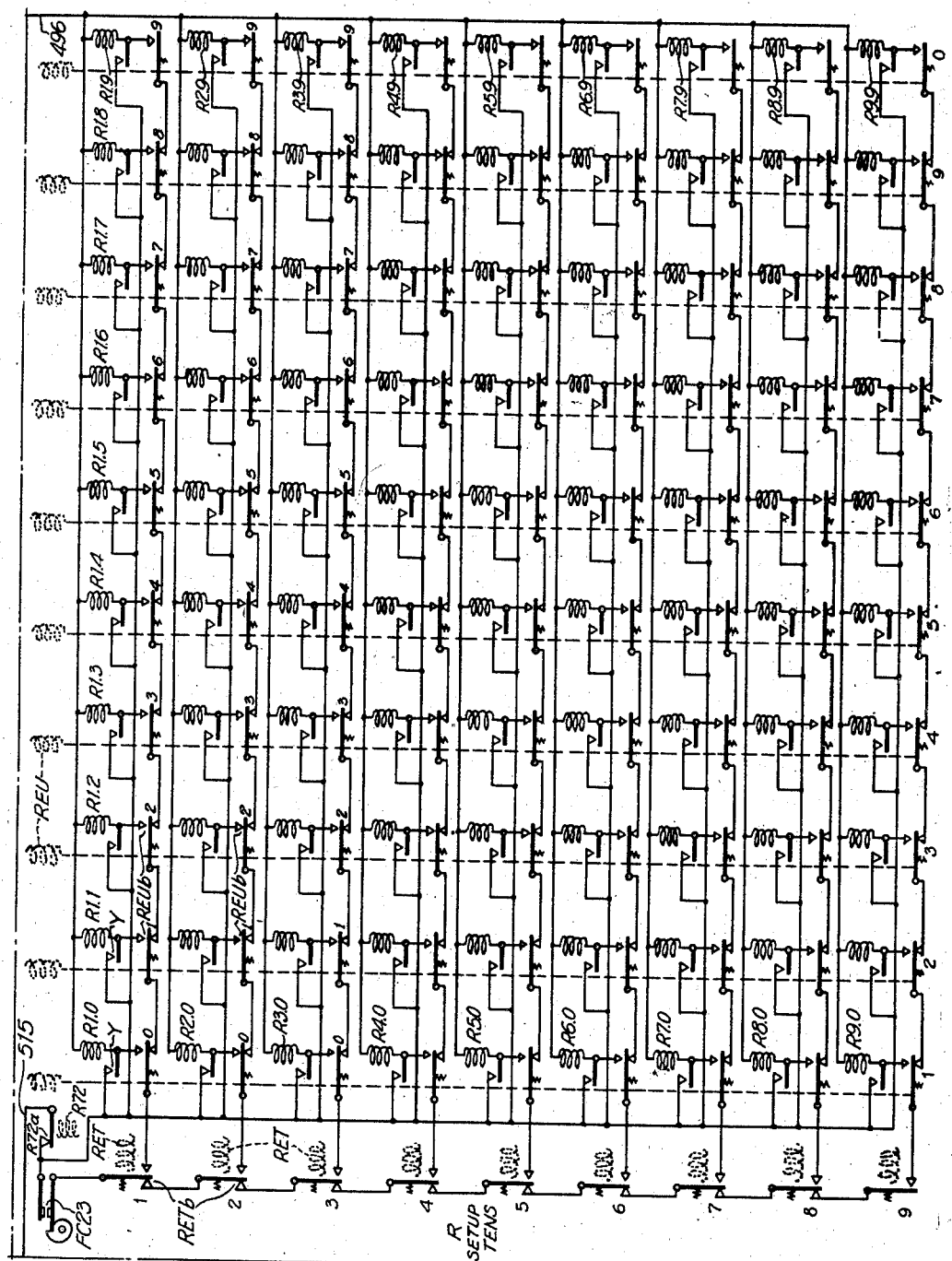

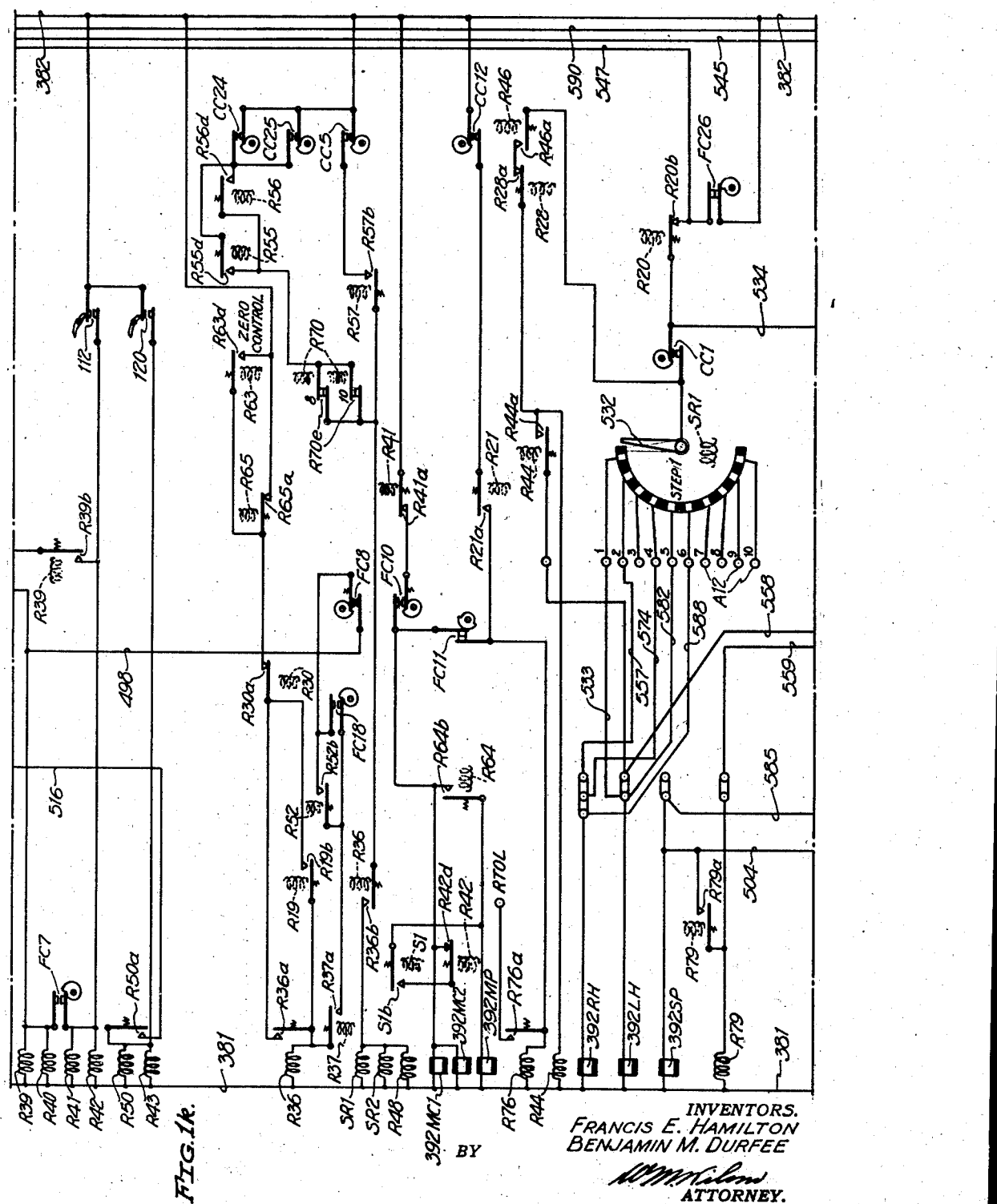

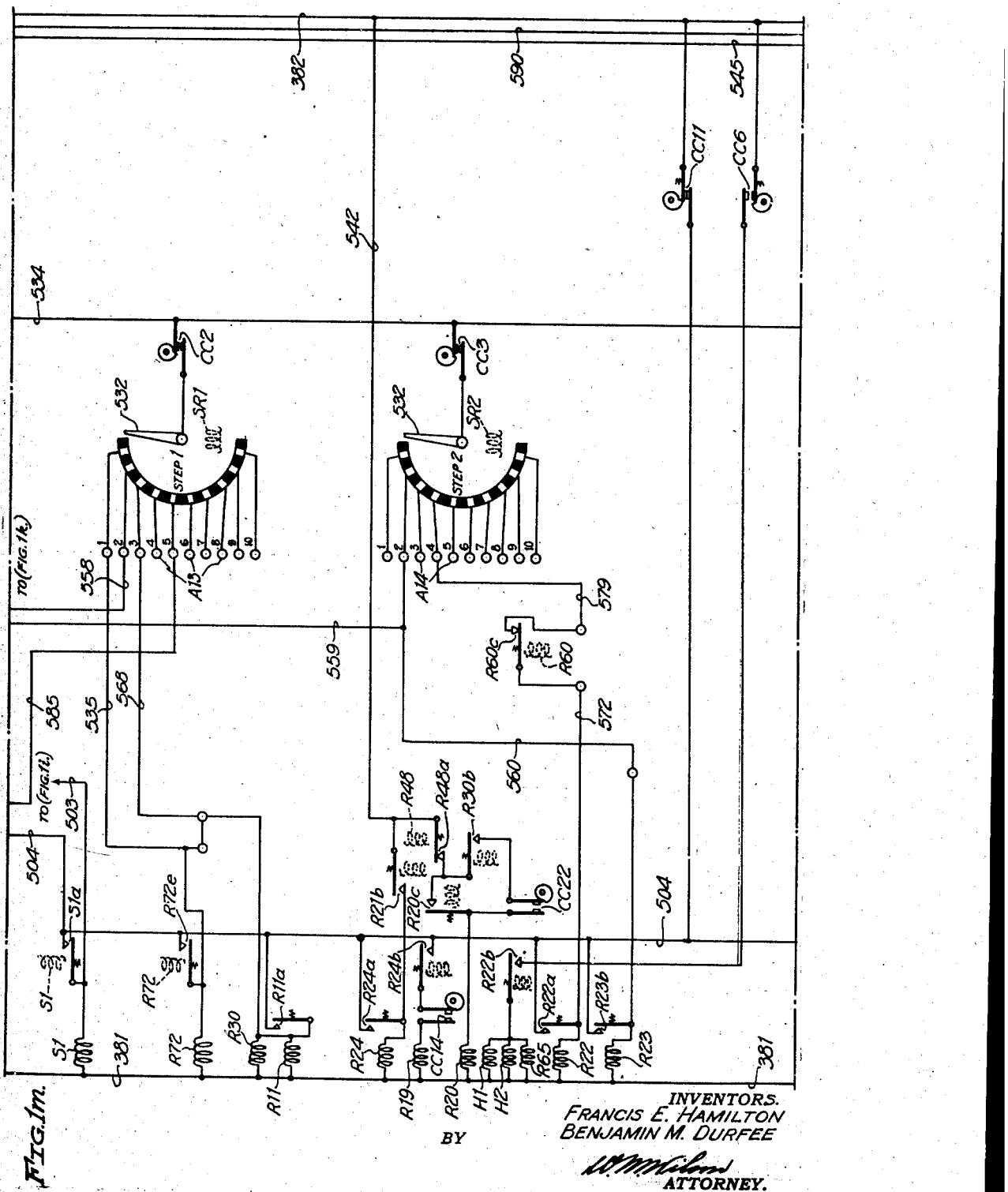

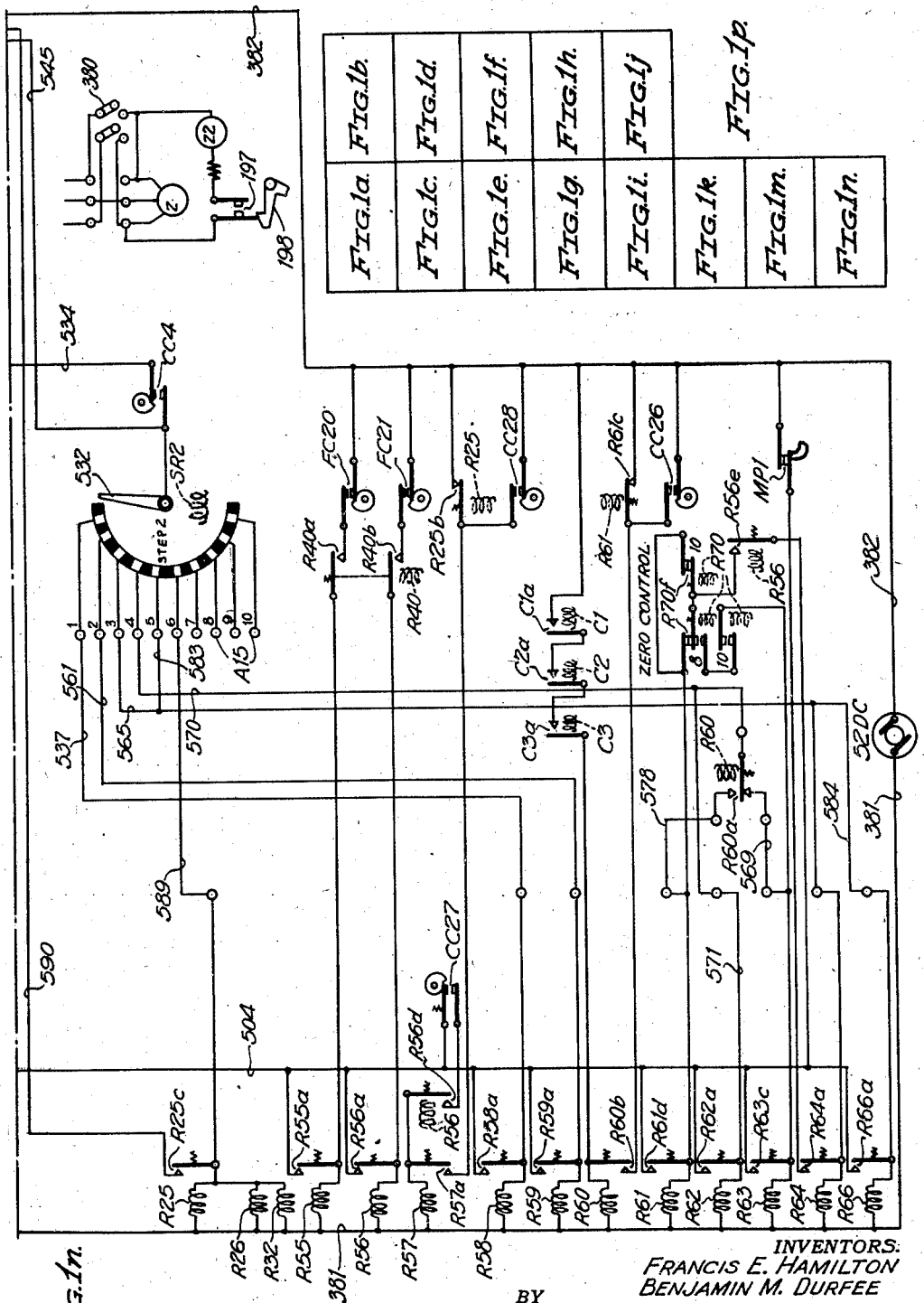

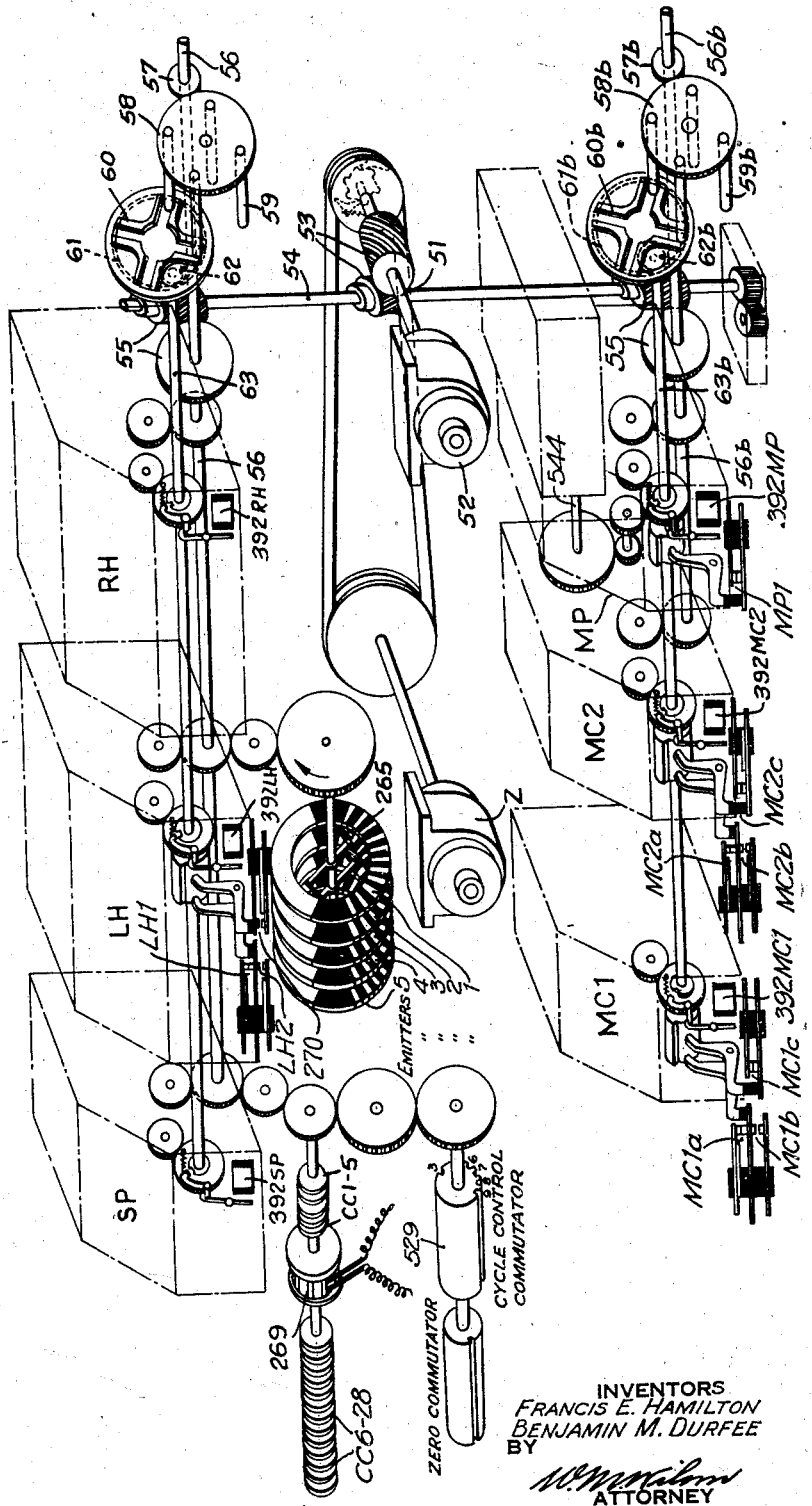

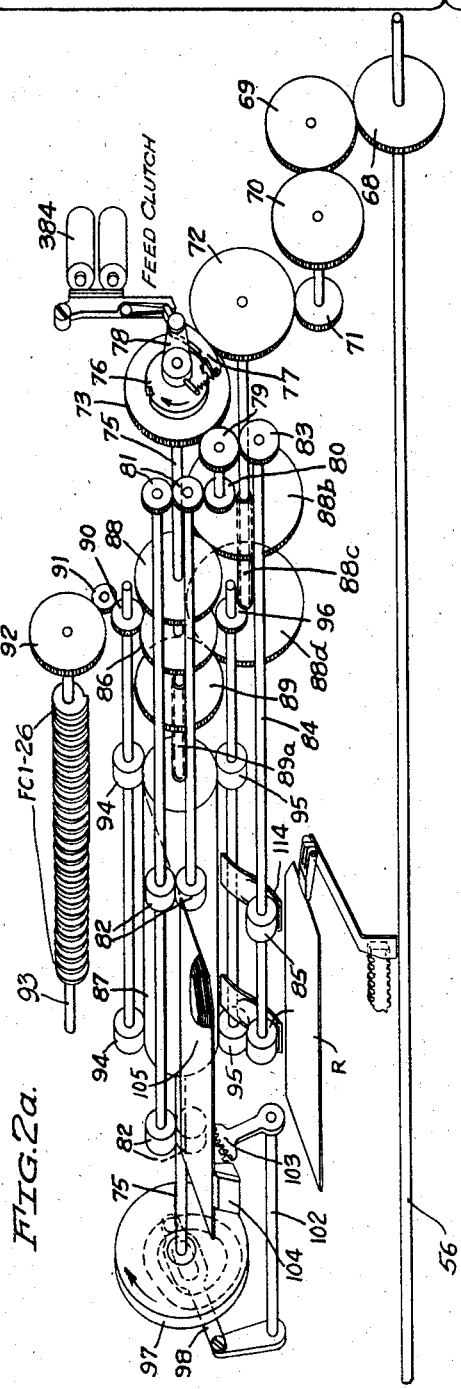
FIG. 2a.
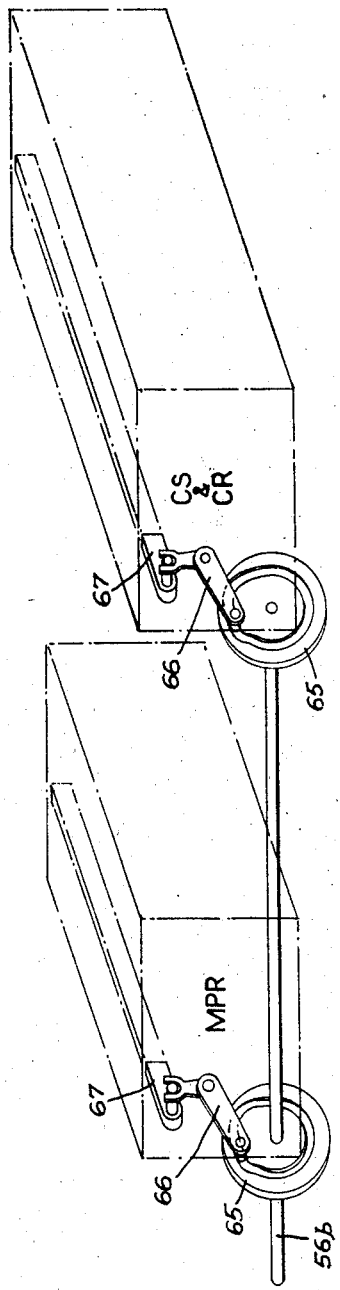

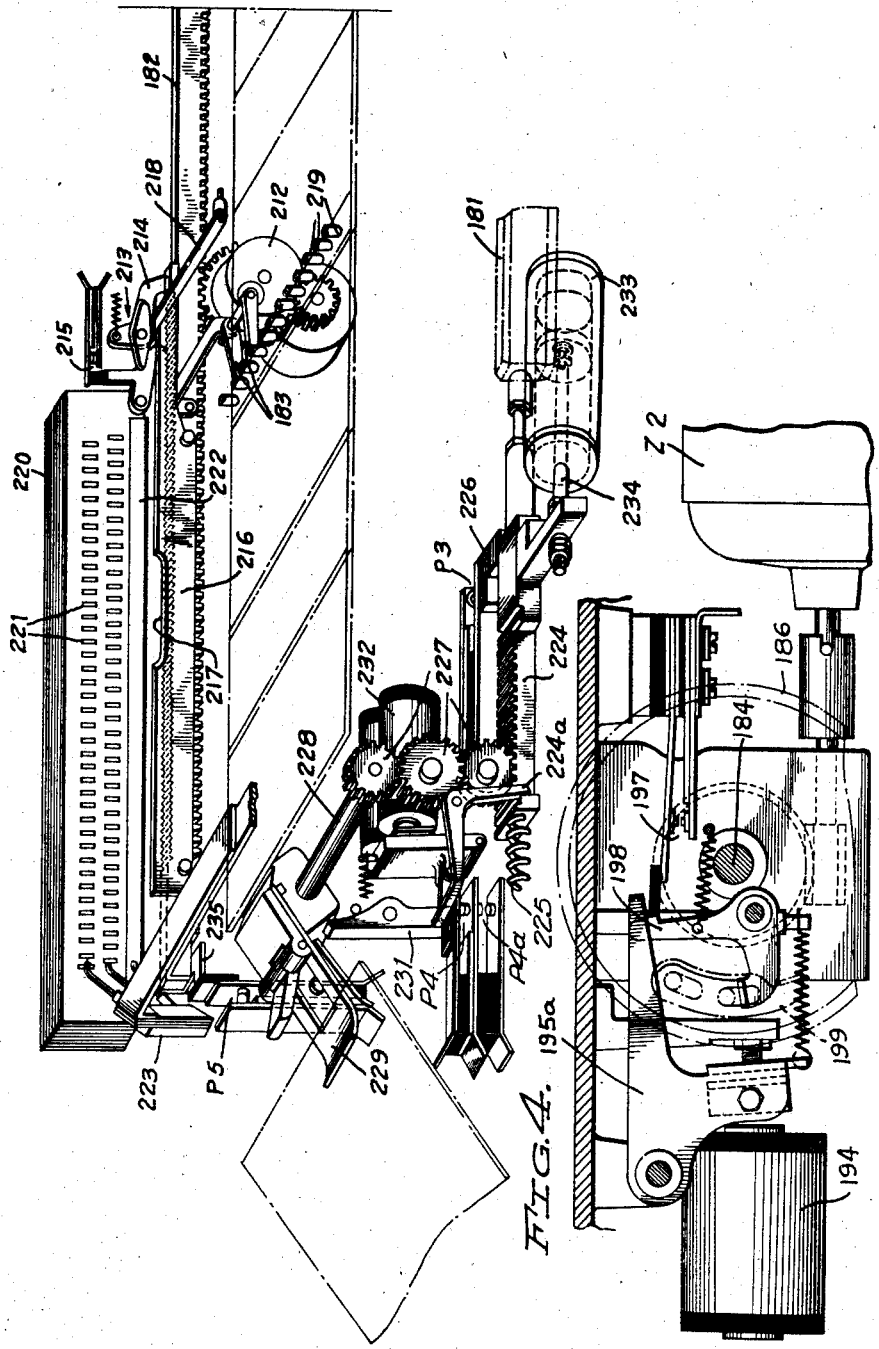

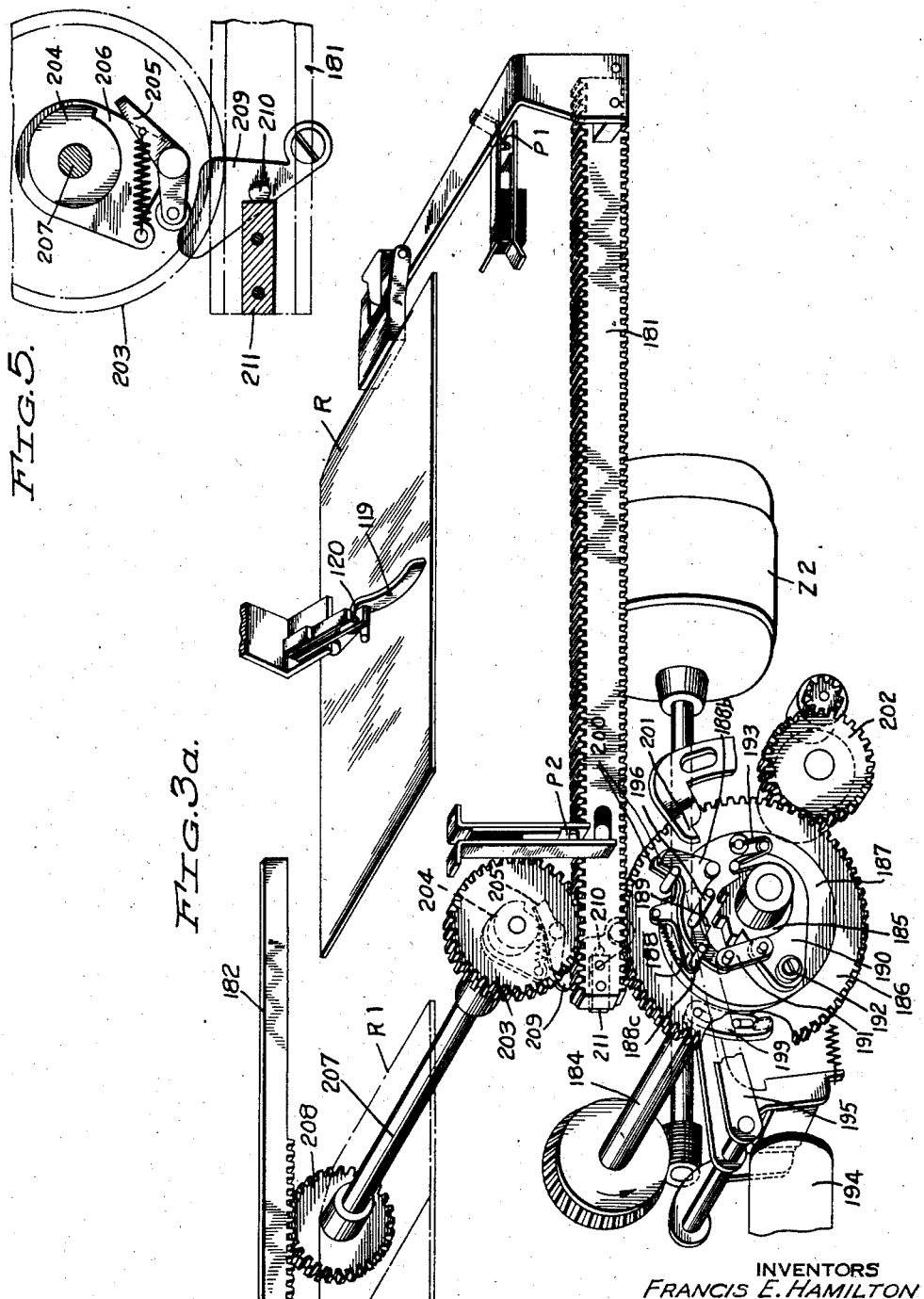

July 15, 1947.     F. E. HAMILTON ET AL     2,424,091
RECORD CONTROLLED DIVIDING MACHINE
Filed Dec. 9, 1944     26 Sheets-Sheet 18
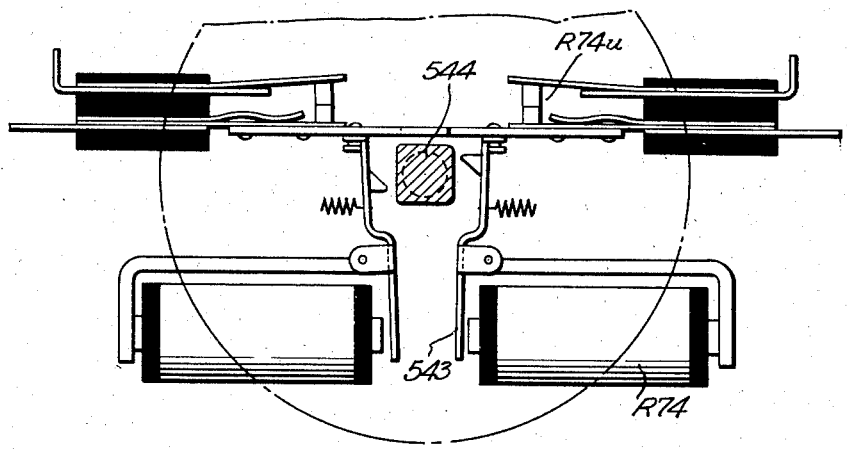
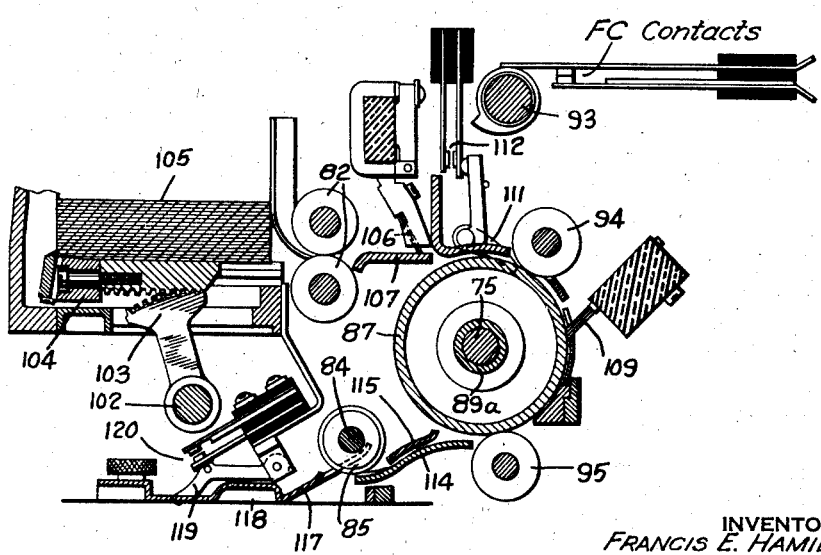
INVENTORS
FRANCIS E. HAMILTON
BENJAMIN M. DURFEE
BY
ATTORNEY

July 15, 1947.    F. E. HAMILTON ET AL    2,424,091
RECORD CONTROLLED DIVIDING MACHINE
Filed Dec. 9, 1944    26 Sheets-Sheet 26

FIG. 10e.

INVENTORS
FRANCIS E. HAMILTON
BENJAMIN M. DURFEE
BY
ATTORNEY

Patented July 15, 1947

2,424,091

UNITED STATES PATENT OFFICE 2,424,091

RECORD CONTROLLED DIVIDING MACHINE

Francis E. Hamilton, Endicott, and Benjamin M. Durfee, Binghamton, N. Y., assignors to International Business Machines Corporation, New York, N. Y., a corporation of New York Application December 9, 1944, Serial No. 567,420

6 Claims. (Cl. 235—61.6)

1

This invention relates to record controlled calculating machines and more particularly to machines in which multiplying and dividing operations are performed.

The principal object of the invention is to provide an improved machine in which the operation of division is performed by multiplying the dividend by the reciprocal of the divisor.

A further object of the invention is to provide mechanism for obtaining the reciprocal of the divisor extended to a predetermined degree of accuracy and multiplying the reciprocal by the dividend.

A further object of the invention resides in the provision of improved cycle controlling mechanism for the multiplying devices of the machine.

A still further object resides in the provision of mechanism for setting up a dividend and divisor, selecting from a preset table of reciprocals the one corresponding to the two highest order digits of the divisor, thereafter if the divisor has more than two places, computing the reciprocal of the complete divisor, and then multiplying the dividend by the computed reciprocal to obtain the quotient.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, 1c, 1d, 1e, 1f, 1g, 1h, 1i, 1j, 1k, 1m and 1n, taken together and arranged in the order shown in Fig. 1p, constitute a wiring diagram of the electrical circuits of the machine.

Fig. 1p is a diagram showing the manner in which circuit sheets are to be arranged.

Figs. 2 and 2a placed side by side show the mechanical units of the machine in their relationship with one another and the driving connections for them. The calculating devices are shown in Fig. 2 while the card handling mechanism and certain of the relay devices are shown in Fig. 2a.

2

Figs. 3 and 3a taken together show the punching mechanism in isometric and illustrate the card handling mechanism associated with the punching unit of the machine.

Fig. 4 is a detail of the motor drive mechanism of the punching unit.

Fig. 5 is a detail of a coupling shown in dotted lines in Fig. 3a.

Fig. 6 is a detail of one of the relay mechanisms of the machine.

Fig. 7 is a sectional view showing the card feeding and sensing mechanism.

Figure 8:
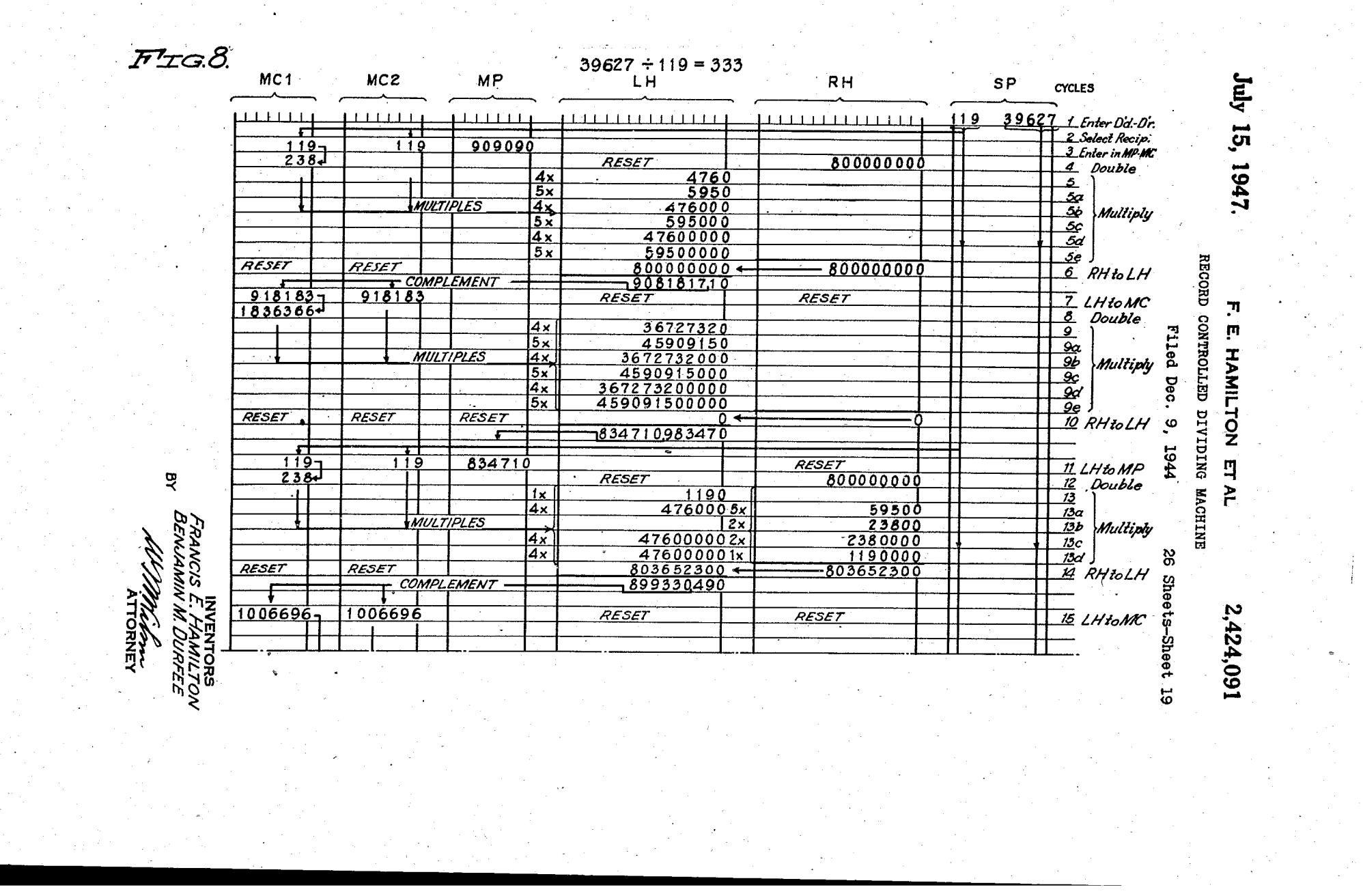
Figure 8A:
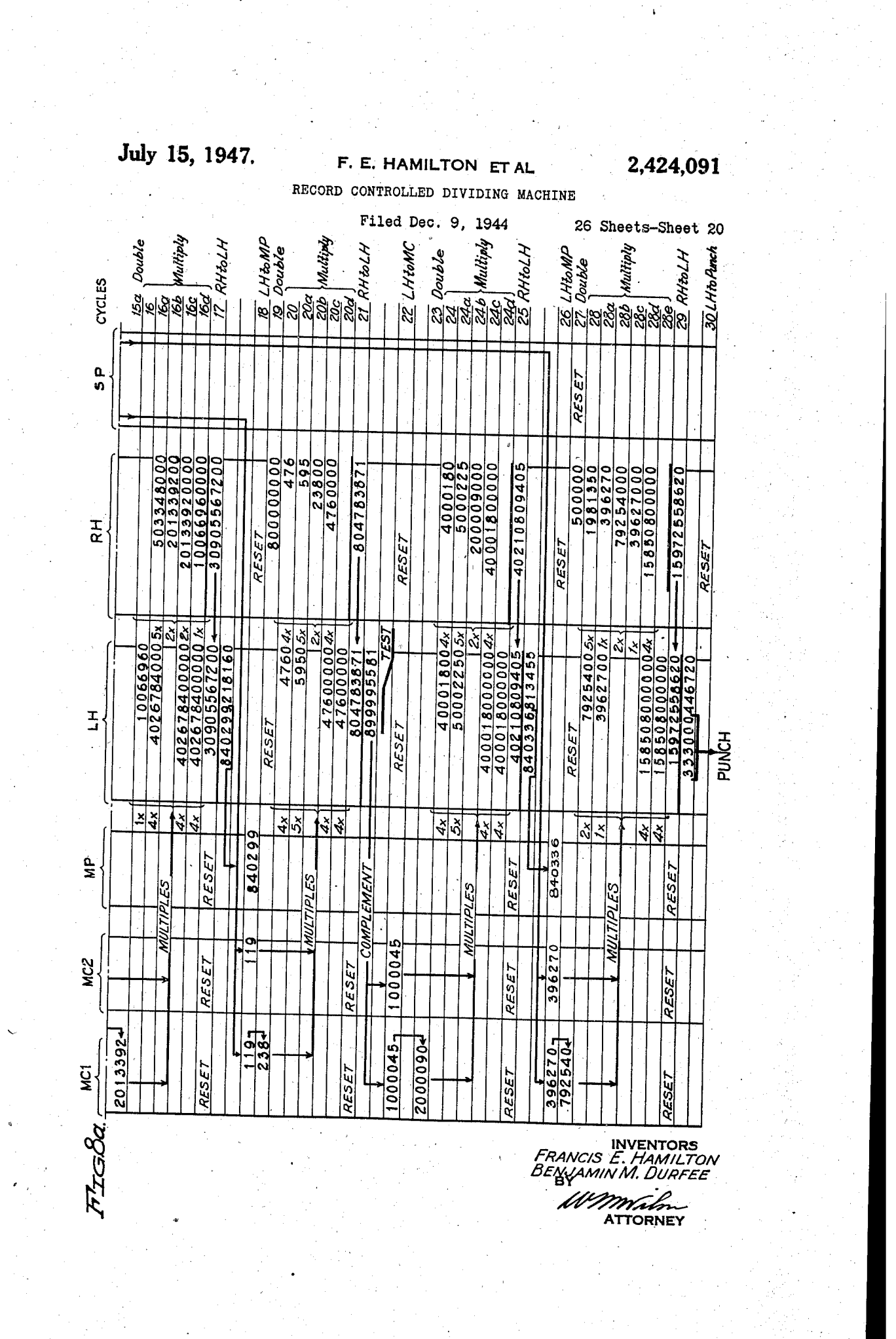

Figs. 8 and 8a taken together constitute a diagram indicating the operations or calculations that take place in the successive cycles of operation of the machine with particular reference to entries made into the several accumulators in carrying out a specific problem.

Figure 9:
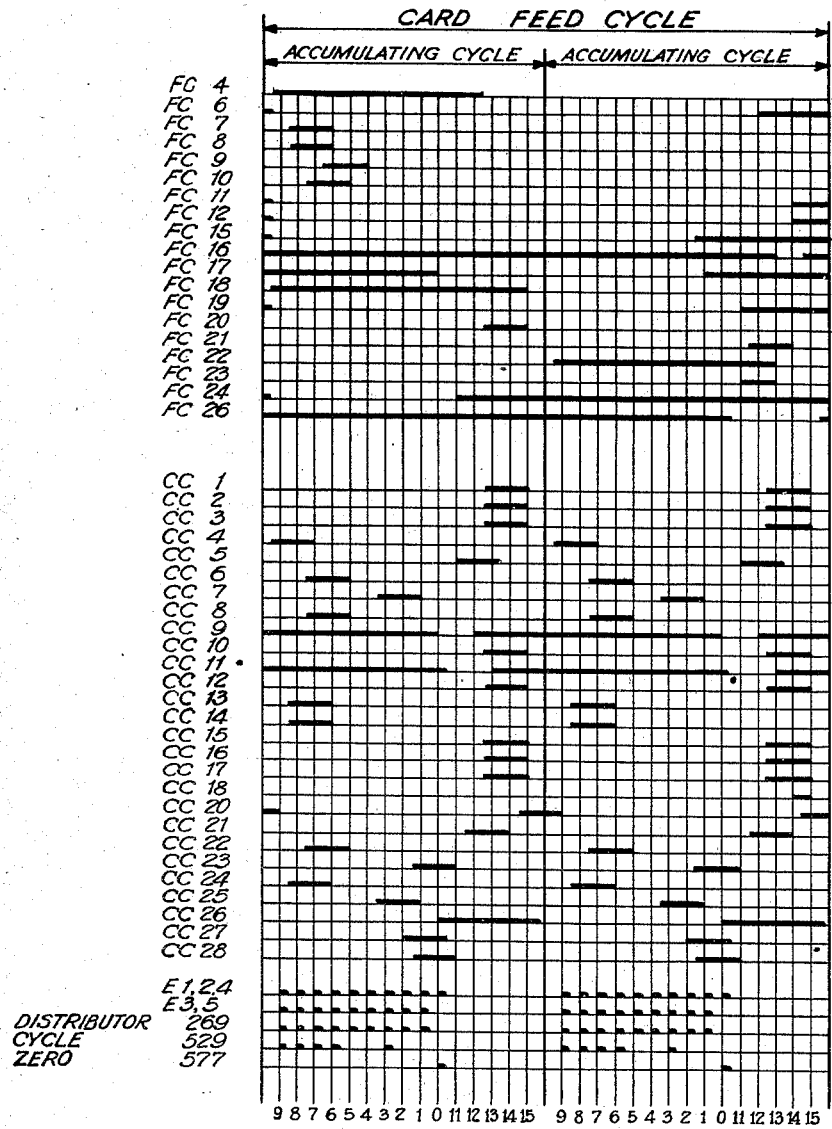

Fig. 9 is a timing chart of the cam contact devices of the machine.

Figs. 10a, 10b, 10c, 10d and 10e taken together in the order named provide a sequence chart on which the operations are graphically illustrated through a succession of cycles of operation.

The machine to which the invention is applied is of the type in which data is derived from record cards and entered into entry receiving devices, which in turn control calculating mechanisms that in turn upon obtaining the required result cause this result to be recorded back in the initial controlling record card. In carrying out the operation of dividing in accordance with the present invention, the record card is perforated with representations of a dividend and a divisor which, when the card is initially sensed or analyzed, are entered into and stored in an entry receiving device which in machines of this type is generally in the form of an accumulator.

There is provided in the machine a set of ninety relays, one for each of the numbers from 1.0 to 9.9 inclusive. Each of these relays is selectable to control the entering devices of an accumulator so that the reciprocal of the number related thereto may be entered in such accumulator correct to six places. Where the divisor derived from the record card is a two place number, the related reciprocal relay is selected and the corresponding reciprocal is set up in the accumulator, and a multiplying operation is performed with the selected reciprocal and the dividend as factors with the resulting product representing the quotient of the original factors.

Where the divisor contains more than two places and only the two highest contain significant digits, then the operation is the same as just outlined with due consideration of the location of the decimal point. Where the divisor contains more than two significant digits, a selection is made of the reciprocal relay corresponding to the number represented by the two highest order digits of the divisor, and the machine enters into a series of what may be termed "interpolating" cycles of operation, during which the selected reciprocal is modified or reduced in value until the reciprocal of the entire divisor is obtained. When this is effected, the reciprocal so obtained is multiplied by the dividend to obtain the ultimate quotient.

A brief explanation will now be given of the mathematical procedure involved in deriving the reciprocal of a divisor having more than two significant digits therein. The method employed utilizes the iteration formula $$N_R[2-N(N_R)]=R_1$$

wherein $N_R$ represents the reciprocal of the number represented by the two highest orders of the divisor, N represents the complete divisor, and $R_1$ represents what might be termed a "first" reciprocal. Considering a concrete example with a divisor such as 119 and substituting the appropriate values in the formula, we have $$.909090[2-1.19(.909090)]=R_1$$

where .909090 is the reciprocal carried out to six places of the number 1.1. Reducing the equation we have $$R_1=.834710$$

The operation is now repeated with the value of $R_1$ substituted for $N_R$ in the formula, giving $$.834710[2-1.19(.834710)]=R_2$$

Solving this results in $$R_2=.840299$$

which may be termed the "second" reciprocal. Repeating the process by substituting $R_2$ in the formula in place of $N_R$, we have $$.840299[2-1.19(.840299)]=R_3$$

Solving this equation further, we obtain $$.840299[1.000045]=R_3=.840336$$

The machine makes an inspection of the value in the brackets, that is, the value 1.000045, and when it finds that the three orders to the right of the decimal point represent zero, it determines that the repeated solution of the formula, with the substitution of the successive reciprocals, has been carried out sufficiently to obtain the reciprocal of the initial divisor correct to six places. Inspection will show that to continue the substitution of $R_3$ for $N_R$ in the formula would still result in the first six places reading .840336.

When the interpolating operations have arrived at the stage indicated, a multiplying operation is carried out with the values 39627 and .840336 as factors which result in the product 33299.994672. With a so-called half-cent corrective which involves adding a 5 to the second decimal position, the value is reduced to 33300.04, the quotient of 39627 divided by 1.19. The quotient of 39627 divided by 119 requires a decimal point shift two places to the right to produce 333.0004. The six highest positions of this number, namely, 333.000 are then punched back into the card to represent the quotient of the initial values.

*The procedure as applied to the mechanism*

The foregoing mathematical steps involved will now be set forth with particular reference to Figs. 8 and 8a. The steps involved in the procedure will be explained in connection with Figs. 3 and 8a, where the several accumulators are identified in the upper part of the chart and the various cycles of operation, beginning with the entry of the dividend and divisor into the SP accumulator, are indicated in the right hand margin. Thus, it is seen that in the first cycle there is the initial entry, in the second cycle a reciprocal relay is selected which during the third cycle effects the entry of 909090 into the MP accumulator, while the divisor 119 is entered into accumulators MC1 and MC2. A fourth cycle takes place during which the entry in accumulator MC1 is doubled and at the same time a value 8 is entered into the ninth order from the left of the RH accumulator. This value 8 is the tens complement of the 2 in the formula given above and is entered in the appropriate denominational order for complementary addition to the product of 119 times 909090. Instead of first obtaining this product and then subtracting it from 2, the machine adds an 8 along with the subproducts entered in the RH accumulator. The 8 is entered during cycle 4 through circuits explained later under the heading "Cycle 4." In the subsequent cycles 5—5e inclusive, operations take place during which 119 and 909090 are multiplied together.

In the present machine the particular form of multiplying employed is known as the "factorial addition" method in which preadjusted multiples of the multiplicand (119) are selected and added together in a pair of accumulators designated LH and RH, with the LH accumulator receiving multiples determined by the tens, thousands and subsequent alternate digits of the multiplier, and the RH accumulator receiving multiples in accordance with the units, hundreds, etc., orders. For the present example, the units, hundreds, etc., orders contain zeros, so there are no entries in the RH accumulators other than the initial entry of 8 in the position indicated. On line 5 the amount 4760 represents 40 times 119 and on line 5a the amount 5950 represents 50 times 119, and their sum is 90 times 119. On lines 5b and 5c the 4 times and 5 times multiples are again entered with columnar displacement to represent 9000 times 119, and on the next two lines these multiples are again entered with a still further displacement to represent by their sum 900000 times 119.

In Cycle 6, the amount in the RH accumulator is transferred to the LH accumulator, resulting in the value 908181710 which in the next following cycle is transferred in the form of a complement to the MC1 and MC2 accumulators, the value transferred being 918183 which in the formula discussed above represents $2-N(N_R)$. It will be noted that the machine does not effect a direct subtraction of the product from 2 but instead adds 8 to the product and then subtracts it from 10, this being the equivalent of subtracting from 2 as in the formula. Restating the basic formula in terms of machine operation, the operation taking place might be expressed as follows after selection of the first reciprocal.

.909090 times the complement of 8+1.19 (.909090)
.909090 times the complement of 9.0818170 or

.909090 × .918183 = 834710 = R1

In the eighth cycle, the value in the MC1 accumulator is again doubled for factorial multiplying purposes, and then in cycles 9—9e inclusive the multiplying operations are carried out to obtain the first reciprocal $R_1$. The operations indicated from cycle 3 to cycle 9e are now repeated in cycles 10 to 17 with the value of $R_1$ used in place of the reciprocal .909090, which results in cycle 17 in the second reciprocal $R_2$ of 840299. Thereafter, the series of operations is repeated a third time from cycles 18 to 25, at the end of which the third reciprocal $R_3$ of 840336 is obtained. The value in the LH accumulator is tested during the operations and, when it is found that the sixth, seventh and eighth orders thereof from the left contain 9's, the machine terminates the interpolating operations when the next reciprocal, namely, $R_3$, has been ascertained.

In cycle 21 it is seen that this condition of 9's in the three orders mentioned is present. In cycle 26 the reciprocal $R_3$ is set up as the multiplier and the dividend 396270 as the multiplicand, and thereafter a series of multiplying operations, taking into account the so-called "half cent" corrective in cycle 27, take place through cycle 29, at which time the quotient 333000 is obtained. Following this, the punching operations take place to punch this value 333000 back into the record card.

*Machine drive*

A general description will first be given of the various units and their location in the machine. In general the various units of the machine are driven and operated in a similar manner to similarly located parts of the machine shown in U. S. Patent No. 2,045,437, granted to G. F. Daly on June 23, 1936. The machine embodies a card feed and card handling section, which is shown on Fig. 2a and also in cross section on Fig. 7. This part of the machine is arranged to feed cards and derive readings therefrom and afterwards pass each card into the punching section of the machine, which punch is of the successive column punching type. A small portion of the punching mechanism only is shown in Fig. 2a, and the rest of the punching mechanism is shown more completely in Figs. 3 and 3a.

The accumulators and receiving devices of the machine are as follows. In the upper part of the machine (Fig. 2) there is shown the RH accumulator, LH accumulator and the summary products accumulator respectively designated RH, LH and SP. In the lower part of the machine there are three accumulators which are used as multiplier and multiplicand entry receiving devices, which are respectively designated MP, MC1 and MC2 on Fig. 2.

The machine also includes a multiplying panel relay unit which is in the lower part of the machine (Fig. 2a) and generally designated MPR. Also in the lower part of the machine there is another multicontact relay unit for column shifting and control purposes, which is generally designated CS and CR.

The machine also includes a number of emitter mechanisms, cam contact devices, impulse distributors, etc., whose general locations are indicated in Figs. 2 and 2a.

The machine is adapted to be driven by a constantly running motor Z (Fig. 2), which motor through a belt and pulley and ratchet drive, drives a shaft 51, which in turn drives an A. C. and D. C. generator 52.

Shaft 51, through worm gear drive 53, drives a vertical shaft 54 for driving the units of the upper and lower sections of the machine. At its upper end, shaft 54 through worm gear 55 drives the main drive shaft 56. The various accumulators are driven from this shaft in the customary manner.

The reset drive for the upper accumulator units is provided as follows. Shaft 56 carries a spur gear 57, driving a gear 58 with a four to one drive ratio. Gear 58 has extending from it four Geneva pins 59 cooperating with the other or cross element of the Geneva designated 60. Secured to 60 is an internal gear 61, which meshes with the spur gear 62 mounted on the end of the reset shaft 63.

The accumulators are reset from this reset shaft in the customary manner by electromagnetically controlled one revolution clutches generally prefixed 392.

The drive for the lower units of the machine is substantially the same as previously described, i. e., the shaft 54, through worm gearing 55b, drives the lower drive shaft 56b, which shaft is also used for actuating parts in the MPR, CS and CR units. A similar Geneva drive 57b, 58b, 59b and 60b is adapted to drive an internal gear 61b which in turn drives a pinion 62b, mounted on the end of the lower reset shaft 63b. The lower reset shaft 63b is adapted to reset the MP and MC entry devices by means of the usual electromagnetic one revolution clutches.

*Card feed and card handling unit drive*

Referring to Fig. 2a the shaft 56 is provided with a gear 68, which through an idler gear 69 drives a gear 70 which through its shaft drives gear 71, which gear 71 in turn drives gear 72. Gear 72 in turn drives a gear 73 revolubly mounted on shaft 75. Gear 73 has fixed to it one element 76 of the one revolution clutch, the complemental part of which comprises a pawl 77, carried by an arm 78 which is fixed to shaft 75. The one revolution clutch is of the customary electromagnetic type used in the tabulating machines and, with this one revolution clutch engaged by the energization of its clutch magnet 384, the shaft 75 will rotate in unison with gear 73, and with the one revolution clutch disengaged 73 will continue its rotation and shaft 75 will remain stationary.

Gear 73 also drives an intermediate gear 79 which is fixed to the gear 80, which drives a train of gears 81 and which in turn drive the card feed rolls 82 of the machine (see also Fig. 7). Such card feed rolls 82 are constantly rotating feed rolls, the same rotating at all times when gear 73 is rotating and when the main accumulator drive shaft 56 is rotating. Also in train with gear 79 is a gear 83, which gear constantly drives a drag roll shaft 84, having fixed thereon a pair of drag rolls 85.

As usual, provision is made for providing a slight creep of the point of pickup of the card transfer and contact cylinder 87 upon successive cards, so that the sensing points on this contact cylinder shifts slightly from card to card. In this way an improved sensing action is secured and the cylinder is prevented from being pitted at the index points by the action of the brushes. As shown in Fig. 2a the one revolution element clutch 76 is provided with two notches and the arrangement of this clutch is such that, whenever the pawl 77 is engaged, the element 78 of the one revolution clutch will make one complete revolution. The one revolution clutch pawl 77 can be engaged in either of the two notches of the clutch element 76, which relation of the clutch members is provided because after the machine has been started and is running on a run of cards, one accumulator cycle is required to traverse the card and carry it past the sensing brushes and another cycle is required to deliver the card to the punching section of the machine.

To provide for a creep of the point of pickup of the card transfer and contact cylinder 87, the following drive is provided. Fixed to shaft 75 is a gear 88, which in turn drives a gear 88b mounted on the sleeve 88c, which in turn drives a gear 88d. Gear 88d in turn drives gear 89, which is fixed to the sleeve 89a revolubly mounted on shaft 75 but fixed to the card transfer and contact cylinder 87. Gears 88 and 89 have a slightly different diameter, and gears 88b and 88d also have a slightly different diameter. This slight difference in diameter provides for the slight creeping advance of card transfer and contact cylinder 87, as the card handling operations ensue and serves to prevent sensing occurring at the same spot or spots on successive card cycles.

Drive to intermittently actuated contacts

Gear 86 is fixed to shaft 75 and drives a gear 90, which gear in turn drives an idler gear 91 driving a gear 92 fixed to cam contact shaft 93. Shaft 93 has secured upon it a number of cams for actuating the FC group of cam contact devices of the machine. Such cams are so driven that they make one revolution per card feed cycle in contradistinction to an accumulator cycle. Fixed to the shaft of gear 90 are card feed rolls 94, which are spring pressed into contact with card transfer and card contact cylinder 87. Similar spring pressed card feed rolls 95 also cooperate with the transfer and contact roll 87 and such rolls are driven by the gear 96 in train with gear 86. Rolls 94 and 95 are preferably made of insulating material.

Card picker drive

Shaft 75 has secured to it a box cam 97 (Fig. 2a) with which a follower 98 cooperates. The follower rocks a shaft 102 carrying a gear sector 103 (see Fig. 7) which is in engagement with a picker block 104. Upon engagement of the one revolution clutch 76, 77 the picker is called into action to withdraw a single card from the magazine 105 (Fig. 7) and advance this card into the bight of rolls 82. These rolls in turn forward the card to the card transfer and contact roll 87. Intermediate rolls 82 and the transfer cylinder 87 there is provided an advance or X brush sensing position at which several sensing brushes designated 106 are provided. The brushes 106 cooperate with the combined contact and card guide plate 107. A curved card guide is provided around the transfer cylinder and the advancing card is carried around by the forward rotation of the transfer cylinder and by the rotation of rolls 94 to traverse the main card sensing brushes generally designated 109 in Fig. 7. Also in cooperation with the card is a pivoted card lever 111 adapted to operate the usual card lever contacts 112.

After the card has been sensed by the main sensing brushes 109, it is advanced between guiding members 114 and 115 by the cooperation of feed rolls 95 with cylinder 87. While between these members it is advanced by drag rolls 85, which extend downwardly into recesses of the lower member 114, as shown in Fig. 2a. This arrangement provides for the feeding of the card and the advance of the card after it has been released by the rolls 95, so that the card may be delivered into the tray of the punching section of the machine. The drag rolls 85 deliver the card under the guiding member 117 and, after the card has been freed from the drag rolls, the card is flipped down into the tray of the punching section of the machine. The location of this tray is generally designated at 118 in Fig. 7, and the position of the card in this tray is indicated at R in Fig. 2a. A card lever 119 (Fig. 7) is also provided and adjacent the tray for closing card lever contacts 120 when the card is lodged in the tray of the punching section of the machine.

With the traverse of the card past the main sensing brushes 109, the amount of the multiplier and multiplicand will have been read from the card and entered into the MP and MC receiving devices of the machine. The MP receiving device and MC receiving device and of the LH and RH and SP accumulators are of the usual type as customarily used in tabulating machines and are provided with electromagnetically operated clutches.

Punching mechanism

The punching mechanism is of the customary successive column acting, repetition punching type as generally used in machines of this class. It is generally of the form shown in Lee and Phillips United States Patent 1,772,186 and in British Patent 362,529, corresponding to the United States patent to Lee and Daly 1,976,618.

The mechanism of the punching section includes two card feed racks 181 and 182 (see Figs. 3 and 3a). 182 carries an arm provided with pusher fingers 183. The drive is by a separate motor Z—2, which through the driving train shown drives shaft 184 which has a ratchet shaped clutch element 185 fixed on one end of it. Alongside of 185 is a gear 186 which meshes with the lower teeth of 181. Secured to 186 is a disk 187. Pivoted on 187 is a member 188 provided with a ratchet shaped clutch tooth 189. Alongside of 188 is another member 188b which lacks the clutch tooth. On 188 is a pin 188c overlying an arcuate surface of 188b. The free end of 188b is connected to a toggle member 190 by a link 191. 190 is pivoted on 187 at 192. The opposite end of 190 remote from its pivot 192 is connected to a spring element 193, which spring tends to hold the clutch tooth 189 out of engagement with the clutch teeth of element 185 and allows it to engage when 190 is shifted. For the purpose of effecting a clutching action, a punch feed clutch magnet 194 is provided. This magnet when energized attracts its armature and causes an arm 195 to engage a pin 196 (see Fig. 3a in which figure the extension of this arm 195 is shown broken off for clarity of illustration of the other parts), depressing 188b and allowing 188 to descend so that the tooth 189 engages with the ratchet 185. Upon such engagement, the gear 186 will be driven in counterclockwise direction substantially a single revolution, shifting rack 181 to the left. This action will, through the card pusher shown in Fig. 3a, move the card from the R position to the R—1 position. Also when magnet 194 is energized, an arm 195a on the armature will close contacts 197. Such contacts are latched closed by a latch 198 (see Fig. 4). The latch 198 is tripped to allow the contacts to reopen by a knockoff 199 carried on the back of gear 186 (see Fig. 3a). At the termination of the counterclockwise movement of gear 186 the tails 200 of parts 188 and 188b will strike a projection 201 on a fixed plate to effect the disengagement of the tooth 189 from the ratchet 185. This action also restores the toggle parts to normal position.

The above driving action has wound up a spring in barrel 202. Upon disengagement of the one revolution clutch tooth 189, rack 181 returns to the right under the influence of the spring in barrel 202.

The driving train to the second card carriage rack 182 is as follows. Rack 181 has its upper teeth intermeshed with gear 203, which has secured to it a member 204 (see also Fig. 5) having a single notch or tooth disposed in the plane of a pawl 205 which is pivoted on part 206 fixed to the shaft 207. 207 on its opposite end carries a gear 208 which meshes with the card carriage rack 182. Suitable mechanism shown in Fig. 5 controls the coaction of pawl 205 with member 204, so that with the rack 181 in extreme right hand position pawl 205 will be disengaged from the clutch element 204. Such disengagement is effected by the rocking of 209 in a clockwise direction by the coaction of the pin 210 with a block 211 carried on rack 181. Upon initial movement of 181 to the left, the block 211 will clear the pivoted camming element 209 allowing a slight counterclockwise motion of it so that 205, under spring action may rock and engage the tooth of member 204. Thereafter, drive will come from 181 through gear 203, through 204, to pawl 205, to 206, to shaft 207 so that a clockwise rotational movement will be imparted to 207. This action will, through gear 208, traverse rack 182 to the right. The card carriage rack 182 will thus be shifted to extreme right hand position, permitting the card pushers 183 (Fig. 3) to first ride over the surface of the card and ultimately engage back of the trailing edge of the card at the R—1 position.

Rack 182 has associated with it a spring drive comprising the usual spring barrel 212. This spring is wound up by the traverse of 182 to the right and is adapted to cause movement of 182 to the left under spring action. The rack 182 also has associated with it an escapement mechanism 213 having a dog 214. This escapement is more fully described in Schaaf United States Patent 1,426,223 and in Lee and Phillips Patent 1,772,186. The usual controlling contacts 215 customarily used in machines of this class are also provided cooperating with the escapement parts.

Removably secured to the card carriage rack 182 is a skip bar 216 provided with a notched portion 217 which permits skip lifter lever 218 to descend when in the notch or to remain elevated when riding on the high part of the skip bar. When the skip lifter lever descends into the notch, it allows the dog 214 of the escapement mechanism to cooperate with the ratchet teeth of rack 182. With skip lifter lever 218 riding on the top of the skip bar 216, the escapement will be disabled so that the card carriage rack 182 can traverse without stopping at each card column until the notch 217 is reached. Thereafter, there is an intermittent motion of the card carriage to the left under spring action and under escapement control. When the skip lifter lever again rides out of the notch the card carriage rack 182 takes its full excursion of movement to the left. The location of the beginning of the notch in the skip lifter lever bar determines the position for the beginning of result or other punching. When the escapement dog is lifted up, the contacts 215 are open as is customary in machines of this class. It may be explained that various forms of skip bars can be placed in the machine, depending upon the class of work which is to be performed.

The punching mechanism proper need not be fully described as it is set forth in the Lee and Phillips patent above referred to and in British Patent 362,529. In brief, it comprises a set of punches 219, which punches are adapted to be depressed to perforate the card through interposers not shown, but which are under the control of punch selector magnets 407 (Fig. 1g).

Referring to Fig. 3, there is shown disposed alongside of the card carriage rack 182 and fixed to the frame of the machine a block or strip of insulating material 220. Disposed in this block are a number of spots 221 of conducting material and alongside of these spots is a common strip of conducting material 222. A suitable bridging piece or multiple brush assembly 223 is carried by the card carriage rack 182 and, as this card carriage rack moves, the bridging brush 223 is displaced and establishes circuit connections from the common strip 222 to one of the spots 221 depending upon the columnar position of the card carriage rack 182. Spots 221 are preferably placed in two rows and interstaggered as shown. This structure will be hereinafter termed a "reading strip."

Card ejector

Referring to Fig. 3, after the card has reached the R—1 position and has been traversed past the punches and has been punched, or traversed past the punches without punching, it ultimately reaches a position at the extreme left hand of the punching section of the machine from which point it must be discharged into the discharge hopper. The card eject mechanism is shown in Fig. 3 with the parts shown in the position which they assumed before the machine was started into operation or in the eject position. Upon the first card feeding operation through the punching section of the machine, rack 181 will have moved towards its extreme left position. After reaching the dotted line position shown in Fig. 3, 181 moves further to the left and thrusts a rack 224 to the left compressing coil spring 225. Bearing against a shoulder on rack 224 is a contact operating part 226. When 224 is thrust to the left, contacts P3 which were previously closed will open under their own spring action. The thrusting of 224 to the left will also allow a member 224a to rock and allow contacts P4 which were previously closed to open. The displacement of rack 224 to the extreme left position will through intermediate gears 227 rock a shaft 228 in a clockwise direction to bring an ejector clip assemblage 229 away from the position shown in Fig. 3 to a position in which the ejector clip can receive a card which has been advanced through the machine. With the ejector clip assemblage 229 disposed in such card receiving position, the assemblage will be latched in such position by a latch 231, which latch is fully described in U. S. Patent 1,976,618 (see latch 216 of that patent in Fig. 16). The ejector clip latch is adapted to be released by an ejector clip magnet 232. Upon energization of the eject magnet 232, latch 231 is released so that the ejector clip assemblage which has then grasped a card swings from the card receiving position to the position shown in Fig. 3, in which position the jaws of the ejector are opened up so that a card can be discharged therefrom.

To prevent too violent ejecting movement of the ejector clip assemblage, dash pot means may be provided for slowing down the ejecting action. Such dash pot is shown at 233 in Fig. 3 and the piston rod 234 of this dash pot may be connected to a bracket extending from member 224.

*Contact devices in punching section of machine*

The contact devices P3 and P4 have previously been described. In the punching section there are other contact devices as follows. Contact devices P1 (Fig. 3a) are contacts which are closed when the rack 181 is in extreme right hand position and ready to receive a card from the card handling and sensing section of the machine. Contacts P2 (Fig. 3a) are normally closed contacts and are arranged to open up when rack 181 makes a complete movement to the left. Contacts P5 (Fig. 3) are also provided. Such contacts are operated as follows. An extension 235 on rack 182 is adapted, when rack 182 has passed beyond the last card column position to allow contacts P5 which were previously open to close. Such contacts P5 are normally open when rack 182 is in any of the positions to the right of the position beyond the last column position.

Referring to Fig. 2, a number of CC cams are provided for operating the CC cam contacts. Five emitters designated emitters 1 to 5 and two commutators designated zero and cycle control are also provided. These devices are in constant operation and their timing is as represented on the timing diagram (Fig. 9).

The electromagnetically tripped multicontact relays used in the MPR, CS and CR sections (Fig. 2a) are of the type shown in Figs. 10 and 11 of Patent No. 2,045,437. Lower drive shaft 56b drives operating cams 65, cooperating with bell crank follower members 66 and adapted to slidably shift serrated operating bars 67 for the multicontact devices. The relays are of the mechanically positioned and restored electromagnetically controlled type.

*Circuit diagram*

The foregoing has explained generally the usual mechanical construction and operation. In the following, the circuit diagram will be explained with particular reference to the specific problem outlined in Figs. 8 and 8a with the description subdivided by cycles corresponding to the cycles designated in Figs. 8 and 8a, so that the procedure involved in the solution of the problem for one card may be more readily followed. As a preliminary, various plug connections are made, and these will be explained along with the cycles in which circuits through the connections are completed.

*Preliminary operations.*—These cycles are not indicated on Fig. 8 as they are the usual advance cycles occurring only at the very start of operations to bring the first card to the sensing brushes 109. They are shown however in Fig. 10a. The prepunched cards containing the dividend and divisor data are first placed in the supply magazine of the machine, and the operator closes switch 380 (Fig. 1n) to supply current to the main driving motor Z. The motor Z drives the A. C.-D. C. generator 52 and the D. C. section 52DC (Fig. 1n) supplies direct current to lines 381 and 382. Alternating current impulses are supplied by the A. C. section 52AC (Fig. 1b) to ground and to line 383.

At the very start, the last column contacts P5 and the eject contacts P4 (Figs. 1i and 3) are closed, so that when lines 381 and 382 receive current, relay magnets R29 and R46 will immediately be energized through the contacts P5, P4 respectively. Feed rack contacts P1 (Fig. 3a) are also closed at the start, so that a circuit is immediately completed from line 382, contacts P1 (Fig. 1i), R40c, stop key contacts 276 and relay magnets R52 and R31, to line 381. Magnet R46 closes its contacts R46a (Fig. 1k) to complete a circuit when constantly running cam contacts CC1 close which is traceable as follows: from line 382, contacts FC26, contacts R20b, CC1, R46a, R28a, relay magnet R44 to line 381 (see Fig. 10a). Magnet R44 closes its contacts R44a to complete a parallel circuit from 382, contacts FC26, R20b, CC1, R46a, R28a, contacts R44a, the reset magnet 392LH to line 381. 392LH is the usual reset magnet of the LH accumulator (see Fig. 2) which, when energized, couples the reset shaft of this accumulator to the constantly running parts to effect clearing of the accumulator. At this time such reset will clear out any undesired amounts that may have been left from a previous machine operation. During the reset, contacts LH2, LH3, and LH4 (Fig. 1i) are closed near the beginning of the following cycle (LH2 and LH3 only are shown in Fig. 2). This will cause energization of relay magnet R28 (Fig. 1i) through a circuit traceable from line 382, contacts LH2, LH3, contacts R32a, magnet R28 to line 381. Magnet R28 closes its contacts R28b to provide a holding circuit through the feed rack contacts P2 (see Fig. 3a). Concurrent opening of contacts R28a (Fig. 1k) will prevent a second CC1 impulse from initiating a second LH accumulator reset.

At the beginning of the cycle following closure of the main switch 380 when cam contacts CC13 (Figs. 1i, 9 and 10a) close, a circuit is completed from line 382, contacts P1, contacts CC13, magnet R27 to line 381. Magnet R27 closes its contacts R27b to set up a holding circuit through contacts P2 along with relay R28 until these contacts open as an incident to advancing the card to its punching position.

*Preliminary feed cycle.*—Prior to the beginning of this cycle (designated 1—S in Fig. 10a), which is initiated by operation of the start key contacts 275 (Fig. 1i), the relay magnets R27, R29, R46, R31 and R52 are in energized condition. The start key is now depressed to close start key contacts 275 which complete a circuit from line 381, relay magnets R37 and R38 in parallel, cam contacts FC6, start key contacts 275, relay contacts R29a (now closed), relay contacts R39a (upper), cam contacts FC16 to line 382. The closing of contacts R38a will provide a holding circuit through cam contacts FC17. Incidental closure of contacts R38b (top, right Fig. 1i) will complete a circuit from line 382, contacts P1, R38b, R52a (now closed), R35a, FC19, CC21, card feed clutch magnet 384, contacts R43a (Fig. 1g) to line 381.

Energization of the feed clutch magnet 384 will set in motion the FC cams and the card picker knife and will bring about the first of the two preliminary cycles (1—S and 2—S, Fig. 10a), constituting one full turn of the FC cams during which the CC cams operate twice.

When magnets R37 and R38 were energized, a parallel circuit extended from the start key contacts 275 (Fig. 1i), contacts FC6, connection 503 (Fig. 1m), relay magnet S1 to line 381. Magnet S1 is thus energized in parallel with magnets R37 and R38 and is held energized through the holding circuit traceable from line 382 (Fig. 1i), contacts FC17, R38a, connection 503 (Fig. 1m), magnet S1 to line 381. Magnet S1 closes its contacts S1a which provide a further holding circuit for magnet S1 as well as magnets R37 and R38, this circuit being traceable from line 382 (Fig. 1m), cam contacts CC11, wire 504, contacts S1a, magnet S1 to line 381 and in parallel with contacts S1a, connection 503 (Fig. 1i), magnets R37 and R38 to line 381. During the feed cycle, when cam contacts CC11 open, magnets R37, R38 and S1 are deenergized (see Fig. 10a).

As seen from Fig. 9, contacts FC17 (Fig. 1a) open slightly in advance of CC11 so that the former contacts have no effect, and actual deenergization of these magnets is under control of contacts CC11. When cam contacts FC10 (center Fig. 1k) close, a circuit is completed from line 382, normally closed contacts R41a, contacts FC10, magnets 392MC1 and 392MC2 in parallel to line 381. These are the reset magnets for the MC1 and MC2 accumulators, and their energization at the time contacts FC10 close will cause mechanical restoration of the accumulators in the next following machine cycle.

At the time contacts FC10 close, the relay magnet S1 is still energized so that its contacts S1b (left Fig. 1k) are closed and the circuit traced, branches from contacts FC10 through normally closed relay contacts R42d, contacts S1b, now closed, to magnet 392MP and thence to line 381. This is the reset magnet of the MP accumulator and such accumulator is accordingly reset concurrently with the MC accumulators.

The start key is held depressed during this pair of preliminary cycles 1—S and 2—S so that, when contacts FC6 again close near the end of the cycle, relay magnets R37, R38 and S1 are reenergized and holding circuits established therefor. At the end of cycle 2—S, the first card will have been advanced to a point where the X (first extra index point position of the card) will be in alignment with the X brush 106 (Fig. 7), in which position the 9 index point position of the card will be just about to pass under the brushes 109. Also, at the end of this cycle the card lever contacts 112 are closed by the action of the card, and a circuit is completed therethrough which is traceable from line 382 (Fig. 1k), contacts 112, relay magnets R41 and R42 in parallel to line 381. Relay R41 closes a pair of contacts R41c (Fig. 1i) to energize relay R51 through cam contacts FC12. When cam contacts FC19 (Fig. 1i) reclose near the end of the cycle, a circuit is completed under control of contacts CC21 (top Fig. 1i) which is traceable from line 382, contacts P1, R38b now closed, R52a now closed, R35a, FC19, CC21, feed clutch magnet 384, contacts R43a (Fig. 1g) to line 381.

This initiates the second card feed cycle (cycles 1 and 2) during which the card is traversed past the sensing brushes 109 and the factors thereon are sensed for entry into the accumulators.

Cycle #1

Figure 10A:
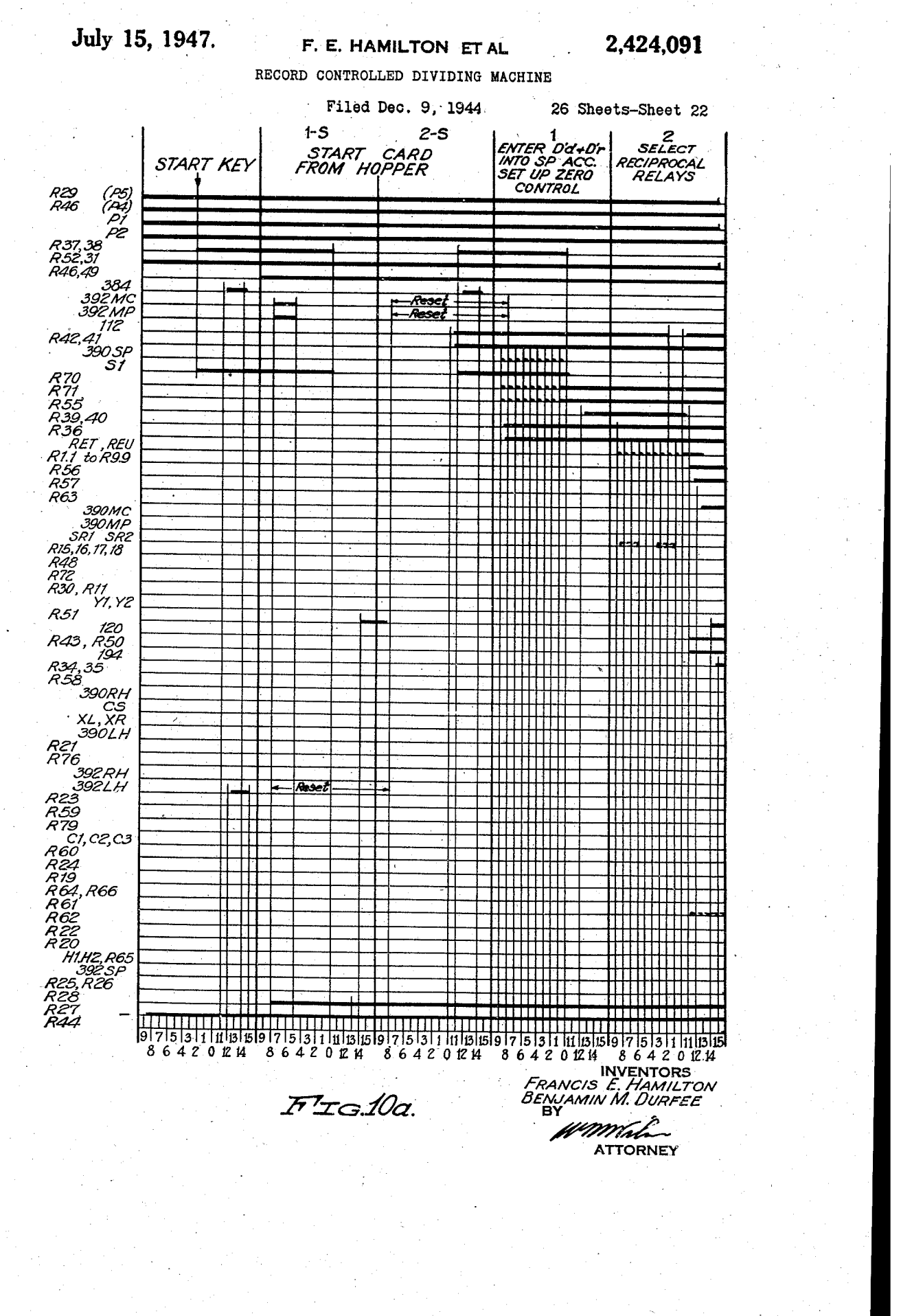
Figure 10B:
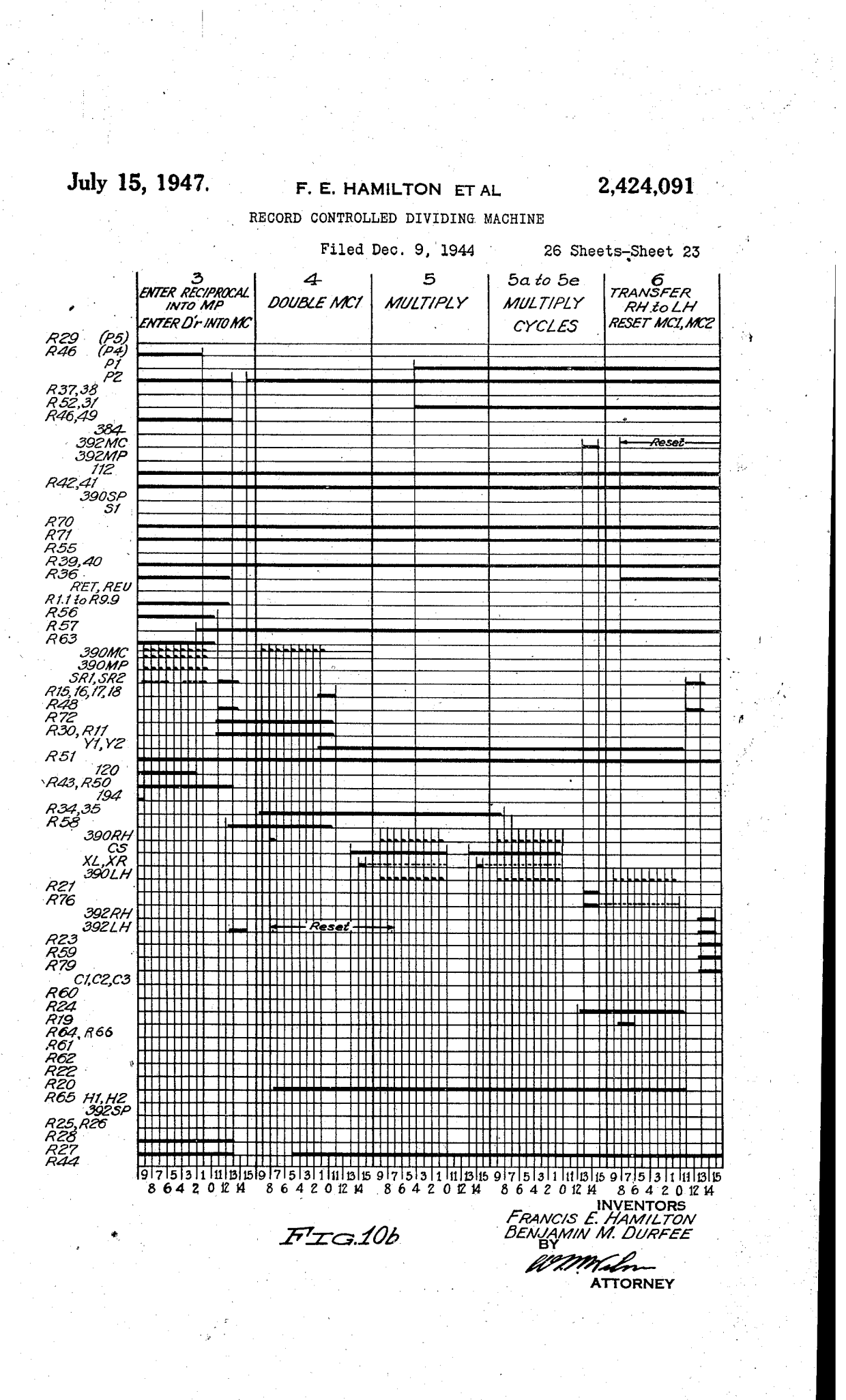

This cycle is designated in Fig. 8 as the first line, and in Fig. 10a as cycle 1, where it is represented that the dividend and divisor are entered into the SP accumulator from the card and the circuits involved in effecting such entry will be explained under this heading.

Figure 1B:
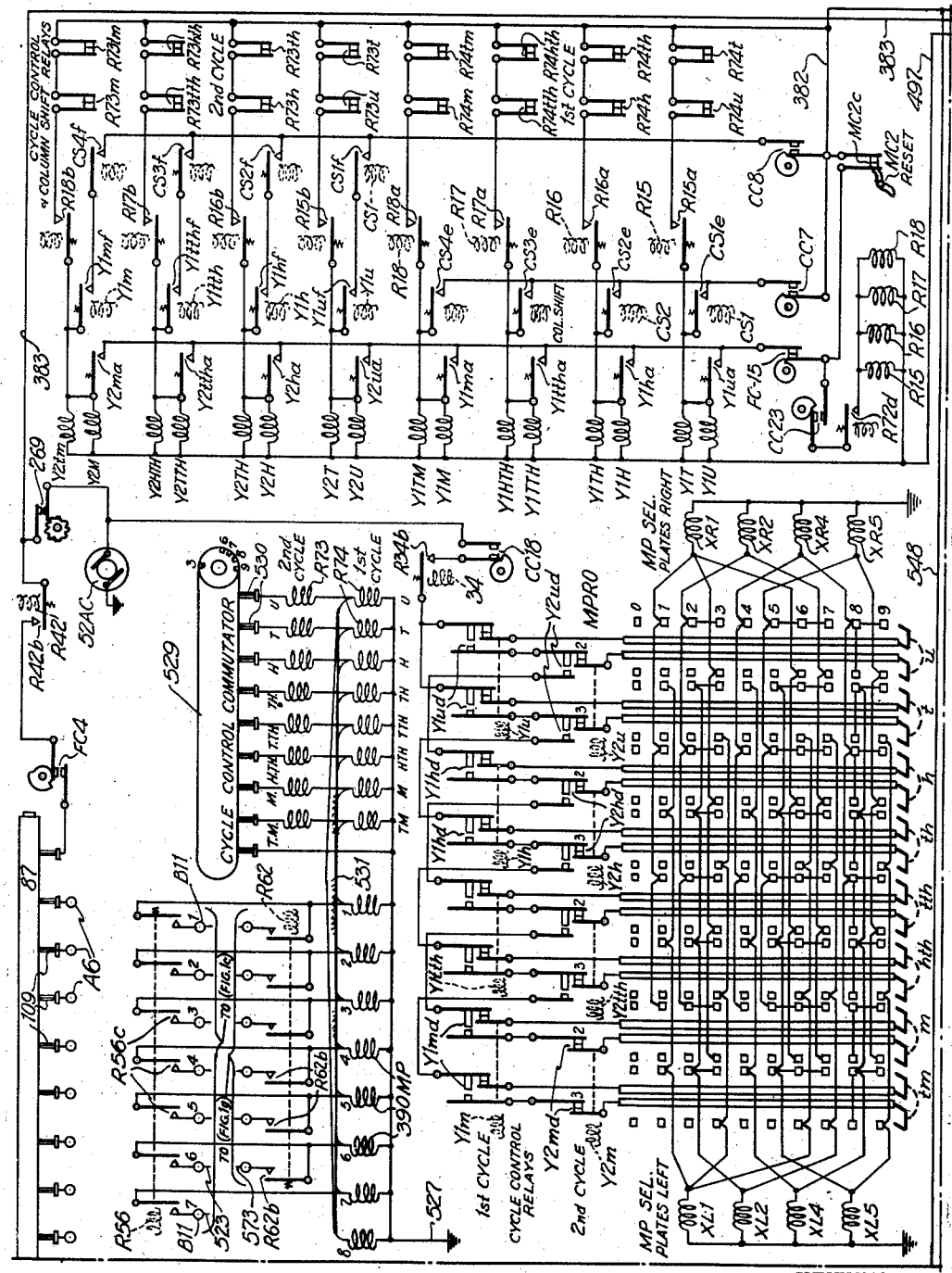

At the beginning of the cycle, the relay magnets R28, R27, R29, R37, R38, R41, R42, R46, R52, R31, R51 and S1 are in energized condition through the circuits already traced. Upon closure of cam contacts FC4 (top Fig. 1b and 9), current is supplied from line 383, contacts R42b now closed, cam contacts FC4 to the common contact roll 87 (Fig. 1a). From here circuits extend through the perforations in the record card to the brushes generally designated 109 which are connected to sockets A6. The sockets of the brushes 109 which read the dividend field of the card are connected through plug connections 506 to the five plug sockets designated B6 (Fig. 1g). In a similar manner the brushes 109 which sense the divisor field are connected through plug connections designated 507 to other plug sockets B6, so that current flows from the common roller 87, through the brushes and connections 506, 507, through relay contacts S1c (Fig. 1g) now closed, to the magnets 390SP and thence to ground. These are the accumulating magnets of the SP accumulator, and their energization at differential times determined by the location of the perforations in the card will, as usual, effect appropriate entries into the accumulator. Plug connections 506, 507 are made so that the dividend is entered into the five lowest order positions of the SP accumulator and the divisor is entered into the three highest order positions as indicated in Fig. 8.

Wired in parallel with the magnets 390SP through a cable 508 (Figs. 1g and 1h) are relay magnets designated R70 which are known as the zero control magnets. They comprise a pickup winding and a separate holding winding which operate on the common contacts R70a. There is a magnet R70 provided for the six lowermost magnets 390SP and the three highest, so that there is one less magnet R70 than there are magnets 390SP. The magnet R70 is energized in response to the entry of a significant digit, and it may be pointed out that zero perforations on the record card are not sensed by brushes 109 so that, where a zero occurs in the factor, no circuit is completed. Thus, for the example under consideration in Fig. 8, where no zeros occur in either of the factors, relay magnets R70 designated 1 to 5 and 8 to 10 are energized, closing their corresponding contacts R70a which in turn establish a holding circuit from line 382 (Fig. 1h), contacts R46b (now closed), R70a, hold winding of magnet R70, wire 497 (Fig. 1g) to opposite line 381.

Near the beginning of the cycle, cam contacts FC7 (top, left Fig. 1k) close, so that relay magnets R39 and R40 are energized in parallel with magnets R41 and R42. Magnet R39 shifts its contacts R39a (bottom Fig. 1i) to provide a holding circuit from line 382, contacts FC16, R39a, magnets R39 and R40 (Fig. 1k) to line 381. A second holding circuit is provided from line 382 (Fig. 1k), X card lever contacts 112, R39b, R39a (Fig. 1i) to the magnets R39 and R40. Concurrently with the closure of contacts FC7, cam contacts FC8 (center Fig. 1k) close, completing a circuit from line 382, contacts 112, FC7, wire 498, contacts FC8, contacts R52b now closed, contacts R37a also closed, relay magnet R36 to line 381. Magnet R36 closes contacts R36a to provide a holding circuit from line 381, magnet R36, contacts R36a, normally closed contacts R30a, contacts R65a to line 382.

When the zero control magnets R70 are energized, they shift related contacts R70b (Fig. 1h) and circuits are completed to energize one or more of a group of relay magnets designated R71 which are called the "shift control" relays, and their energization depends upon the number of magnets R70 that have been energized in response to the sensing of the dividend and divisor factors. These magnets are identified with the numerals 1 to 6 and, if the dividend contains six places, the "6" magnet R70 would be energized causing shifting of the "6" contacts R70b which would complete a circuit from line 382, contacts FC24, contacts R46c now closed, the "6" contacts R70b, the "6" magnet R71, wire 499 (Fig. 1g) to line 381.

In the present example, the dividend has five places so that the "6" magnet R71 is not energized but the "5" magnet R70 is, so that the circuit would extend from contacts R46c to the right hand side of the "6" contacts R70b, the left hand side of the "5" contacts R70b, to energize the "5" magnet R71. The contacts R70b are arranged in series fashion as shown, so that the magnet R71 corresponding to the position in which the highest significant digit of the dividend is found will be energized. The three highest order magnets R71 designated 8, 9, 10, are related to the divisor, and these will be similarly energized, that is, if there is a three-place divisor, the 10 magnet R71 will be energized; if there is a two-place divisor, the 9 magnet R71 will be energized, and if there is a one-place divisor, the 8 magnet R71 is energized. These magnets R71 control contacts which direct subsequent entries into the appropriate orders of the receiving devices as will be explained hereinafter when such entering circuits are traced. These magnets will remain energized until after the completion of the punching of the result back into the card.

When cam contacts FC20 (Fig. 1n) close, a circuit is traceable from line 382, contacts FC20, R40a now closed, magnet R55 to line 381. The magnet closes its contacts R55a to provide a holding circuit extending through wire 504 (Fig. 1m), contacts CC11 to line 382 which holds the magnet R55 energized through the major portion of the next following cycle.

*Cycle #2*

This cycle is the second half of the second card feed cycle and during this cycle the FC cams are still in operation. From Fig. 8 it is seen that during this cycle there is a selection of what will be termed a "reciprocal relay," that is, during the cycle the setting of the divisor will be tested, and one of a number of so-called "reciprocal" relays will be selected in accordance with the value of the divisor. At the beginning of the cycle, the following relays (see Fig. 10a) will be in energized condition:

R27, R28, R29, R36, R39, R40
R31, R41, R42, R46, R52, R55 and "5" and "10" magnets R70 and R71. The magnet R55 has closed its contacts R55b (top right Fig. 1f) which are wired through connections designated 511 to plug sockets (Fig. 1g) of the readout device of the SP accumulator which is generally designated SPRO. The plug connections 511 are made to the sockets associated with the three highest order positions of the accumulator, in which positions the divisor has been entered. These positions are designated 8, 9, and 10.

As the emitter E1 (Fig. 1h) now rotates, circuits will be completed which are traceable from line 383 (Fig. 1h), contacts R23a (upper), emitter E1 to a group of wires generally designated 512 (Fig. 1g) which extend through the readout devices of the SP accumulator to its related sockets thence through connections 511 (Fig. 1f) to the contacts R55b. For the example chosen where the divisor is 119, the "10" relay magnet R71 (Fig. 1h) is energized so that in Fig. 1f the "10" contacts R71b are closed and a circuit continues from the left hand contacts R55b, the left hand contacts R71b, to the "1" magnet RET, emitter E5 through its "1" segment, and thence to ground. The completion of this circuit at the "1" time is due to the fact that the highest order readout brush in the SPRO device is positioned at "1," so that a circuit is completed at the "1" time. The next lower order of the SPRO device is also positioned at "1," so that a parallel circuit extends from the middle contacts R55b, the second contact R71b now closed, through the "1" magnet REU, the emitter E4 to ground. No circuit is completed through the "8" contacts R55b since the "9" and "8" contacts R71b are open.

Where the divisor contains three places, only the two highest are considered in selecting one of th magnets RET and REU for energization, and these are selected in accordance with the value of the two highest order digits of the divisor. Thus, for the divisor 119, the "1" magnet RET and the "1" magnet REU are energized. If the divisor were a two-place divisor, the "9" magnet R71 would have been energized and the selection of the RET and REU magnets would have been in accordance with the digits of such two-place divisor.

Where the divisor contains but a single digit, the circuit would extend through the right hand wire 511, the left hand "8" contacts R71b, to energize the correspondingly valued magnet RET. In such case the zero magnet REU would be energized through a circuit traceable from line 383 (Fig. 1h), contacts R23a, zero segment of emitter E1, wire 513 (Fig. 1f), right hand contacts R55b, right hand contacts R71b, zero magnet REU, zero segment of emitter E4 to ground. The magnets RET and REU jointly control the selection of one of ninety so-called "reciprocal" relay magnets which are designated in Fig. 1j by the letter R followed by the number whose reciprocal they represent.

Referring to Fig. 1f, the RET magnets close contacts RETa and the REU contacts close contacts designated REUa which serve to energize the holding windings of these magnets through circuits traceable from line 382 (Fig. 1h), cam contacts FC22, wire 514, Fig. 1f, contacts REUa and RETa through the holding coils wire 497 (Fig. 1h), wire 497 (Fig. 1g) to line 381. In Fig. 1j are shown contacts RETb numbered to correspond to the nine magnets RET, and there also are shown contacts designated REUb which are also numbered to correspond to the similarly numbered magnets REU. Each REU magnet has nine REUb contacts which it operates. Thus, for the example chosen where the two highest orders of the divisor are both 1, the 1 magnet RET and the 1 magnet REU are energized so that all the 1 contacts REUb in Fig. 1j are shifted, and the 1 contacts RETb are shifted so that, when cam contacts FC23 close near the end of this cycle, a circuit is traceable from line 382 (Fig. 1i), wire 515, normally closed relay contacts R72a, FC23, the right hand side of the 1 contacts RETb, lower of the 0 contacts REUb, upper of the 1 contacts REUb, relay magnet R1.1, wire 496 (Fig. 1h) to line 381. Any other of the ninety reciprocal relays R1.0 to R9.9 in Fig. 1j are similarly selectable under control of the RET and REU magnets. When any such magnet is energized, it closes a pair of contacts which are generally designated "Y" for simplicity the holding circuit being traceable from line 382 (Fig. 1i), wire 515 (Fig. 1j), contacts R72a, Y contacts of R1.1, magnet R1.1, wire 496 to line 381. This holding circuit is maintained throughout the entering portion of the next cycle (see Figs. 10a and 10b) to control circuits as will be explained for such next cycle.

Closure of cam contacts FC21 (Fig. 1n) near the end of the cycle will complete a circuit traceable from line 382, contacts FC21, R40b now closed, relay magnet R56 to line 381. Magnet R56 closes its contacts R56a to provide a holding circuit from line 381, magnet R56, contacts R56a, wire 504 (Fig. 1m), and cam contacts CC11 to line 382.

In Fig. 1n are shown contacts R70f related to the 8 and 10 positions and for the three place divisor used as an example, all three of these contacts will be shifted, so that when relay R56 is energized and closes contacts R56e near the end of the cycle, a circuit is completed from line 381, relay R63, "10" contacts R70f, lower "8" contacts R70f, R56e, wire 504 (Fig. 1m), contacts CC11 to line 382. Relay R63 closes its contacts R63c to provide a holding circuit.

During this cycle, the card advances into the punching section of the machine and in its movement it closes the punch card lever contacts 120 (Fig. 1k) which close the circuit to energize magnets R43 and R50. Relay R50 closes its contacts R50a to set up a holding circuit from line 381, relays R43, R50, contacts R50a, wire 516 (Fig. 1i), contacts P2 to line 382. With relay magnet R43 energized, its contacts R43a (bottom, left Fig. 1g) are shifted so that at the very end of the cycle, when cam contacts CC20 reclose, a circuit is completed from line 381 (Fig. 1g), upper contacts R43a, CC20, the trip magnet 194, eject contacts P3, upper contacts R29c to line 382. The energization of the punch clutch magnet 194 in the manner already explained will cause closure of contacts 197 (right Fig. 1n) which become latched closed by latch 198. Accordingly, current supply is provided for the punch driving motor Z2.

The card which has just been read and which is in the punching unit in the R position is now advanced endwise to the punching unit to the position in which punching is to commence. The operation of motor Z2 will shift the card feed racks and other devices in the punching unit, so that contacts P1 and the last column contacts P5 (Fig. 1i) will open and, as a result, relay magnets R29 and R52 become deenergized.

Cycle #3

Referring to Fig. 8, during this cycle #3 the divisor amount is to be entered into accumulators MC1 and MC2 and the amount 909090, which is the reciprocal of 1.1, is entered into the MP accumulator under control of the R1.1 relay magnet. At the beginning of the cycle, the following relay magnets are in energized condition (see Fig. 10b).

| R28, | R36, | R39, | R40, | | R41 |
| R42, | R43, | R46, | R50, | R51, | R56 |
| R63, | R70, | R71, | R1.1 | | R27 |

The FC cam contacts remain at rest from this point on so their open or closed position will be as indicated along the left hand vertical ordinate in Fig. 9, that is, cam contacts FC6, FC11, FC12, FC15, FC16, FC17, FC19, FC24 and FC26 are closed and the remainder of the contacts are open.

Referring to Fig. 1g, plug connections 517 are made from the plug sockets of the three highest order positions of the SPRO device to sockets B9a (Fig. 1a). With relay magnet R63 energized at this time its contacts R63a are closed (center Fig. 1a) and for the divisor chosen the "10" magnet R71 (Fig. 1h) is energized as explained so that the "10" contacts R71c (Fig. 1a) are also closed. Therefore, as the emitter E1 (Fig. 1h) rotates during this cycle, circuits will be completed at differential times traceable from line 383 (Fig. 1h), contacts R23a, emitter E1, through wires 512 (Fig. 1g), through the readout devices SPRO in the three highest orders containing the divisor 119, through the 8, 9, and 10 sockets plug connections 517 (Fig. 1a) to the plug sockets B9a, thence through the "10" contacts R71c, wires 518 now closed contacts R63a, normally closed contacts R72c to the accumulator magnets 390MC1, to ground.

Through a cable 522 the circuits branch from contacts R72c, through the three lowest ordered or right hand magnets 390MC2 to energize these magnets in parallel with the corresponding magnets 390MC1. These are the adding magnets of the accumulators MC1, MC2 and their energization at differential times in accordance with the setting of the amount 119 in the SP accumulator readout device will effect entry of 119 in each of these two accumulators in the three lowest orders of each as indicated in Fig. 8.

Plug connections 523 (Fig. 1b) have been made from a group of plug sockets A11 (Fig. 1c) to a group of plug sockets designated B11 (Fig. 1b). The sockets B11 are electrically connected to contacts R56c which are now closed. As emitter E3 (Fig. 1d) rotates during this cycle, impulses are directed from line 383, through a group of wires 524 (Fig. 1c), to a group of wires 525 which are numbered 9 to 1 to indicate the time in the cycle when these lines are connected through the emitter to the line 383. Assuming the reciprocal relay R1.1 to be energized, its three contacts R1.1b are closed so that at the 9 time, when current is on the 9 wire 525, parallel circuits extend from this 9 wire, through all three of the R1.1b contacts to wires 526 extending to the plug sockets A11 numbered 6, 4, and 2, thence through the plug connections 523 (Fig. 1b) to the plug sockets B11 numbered 6, 4 and 2, thence through contacts R56c and accumulator magnets 390MP in the positions numbered 6, 4 and 2, and thence through wire 527 to ground. In this manner the reciprocal of 1.1 which is 909090 is entered during this cycle into the appropriate orders of the MP accumulator.

In Figs. 1c and 1e the b contacts of only twenty-six of the ninety reciprocal relay magnets are shown. The b contacts of each of the magnets are connected between a group of wires 525 and 526 and in accordance with the following table of reciprocals from which the connections for the reciprocal magnets not shown can be readily ascertained:

| Relay | | Relay | |
|---|---|---|---|
| 1.0 | 1.000000 | 5.5 | 181818 |
| 1.1 | 909090 | 5.6 | 178571 |
| 1.2 | 833333 | 5.7 | 175438 |
| 1.3 | 769230 | 5.8 | 172413 |
| 1.4 | 714285 | 5.9 | 169491 |
| 1.5 | 666666 | 6.0 | 166666 |
| 1.6 | 625000 | 6.1 | 163934 |
| 1.7 | 588235 | 6.2 | 161290 |
| 1.8 | 555555 | 6.3 | 158730 |
| 1.9 | 526315 | 6.4 | 156250 |
| 2.0 | 500000 | 6.5 | 153846 |
| 2.1 | 476190 | 6.6 | 151515 |
| 2.2 | 454545 | 6.7 | 149253 |
| 2.3 | 434782 | 6.8 | 147058 |
| 2.4 | 416666 | 6.9 | 144927 |
| 2.5 | 400000 | 7.0 | 142857 |
| 2.6 | 384615 | 7.1 | 140845 |
| 2.7 | 370370 | 7.2 | 138888 |
| 2.8 | 357142 | 7.3 | 136986 |
| 2.9 | 344827 | 7.4 | 135135 |
| 3.0 | 333333 | 7.5 | 133333 |
| 3.1 | 322580 | 7.6 | 131578 |
| 3.2 | 312500 | 7.7 | 129870 |
| 3.3 | 303030 | 7.8 | 128205 |
| 3.4 | 294117 | 7.9 | 126582 |
| 3.5 | 285714 | 8.0 | 125000 |
| 3.6 | 277777 | 8.1 | 123456 |
| 3.7 | 270270 | 8.2 | 121951 |
| 3.8 | 263157 | 8.3 | 120481 |
| 3.9 | 256410 | 8.4 | 119047 |
| 4.0 | 250000 | 8.5 | 117647 |
| 4.1 | 243902 | 8.6 | 116279 |
| 4.2 | 238095 | 8.7 | 114942 |
| 4.3 | 232558 | 8.8 | 113636 |
| 4.4 | 227272 | 8.9 | 112359 |
| 4.5 | 222222 | 9.0 | 111111 |
| 4.6 | 217391 | 9.1 | 109890 |
| 4.7 | 212765 | 9.2 | 108695 |
| 4.8 | 208333 | 9.3 | 107526 |
| 4.9 | 204081 | 9.4 | 106382 |
| 5.0 | 200000 | 9.5 | 105263 |
| 5.1 | 196078 | 9.6 | 104166 |
| 5.2 | 192307 | 9.7 | 103092 |
| 5.3 | 188679 | 9.8 | 102040 |
| 5.4 | 185185 | 9.9 | 101010 |

Referring to Fig. 1b, the cycle control commutator designated 529 (see also Fig. 2) has contact segments in only the 9, 8, 7, 6 and 3 contact positions (see Fig. 9). Cooperating with the commutator are brushes 530 extending to relay magnets R73 and R74. The relay magnets R74 are wired in parallel with the adding magnets 390MP, through a cable 531 so that, when any magnet 390MP is energized, a correspondingly ordered relay magnet R74 is energized. In those orders in which the digit entered is 9, 8, 7, 6 or 3, the correspondingly ordered relay magnet R73 is also energized in parallel with magnets 390MP and R74, the cycle control commutator 529 being operative to connect the magnets R73 for energization only for these five digits.

For example, in the second or tens order of the MP accumulator, the circuit extends through the appropriate plug connection 523 to the second plug socket B11, contacts R56c, the tens order magnet 390MP at the 9 time of the cycle. The circuit branches through cable 531 to energize the second or tens magnet R74 at the 9 time. The circuit branches further upwardly through the second or tens magnet R73, the 9 segment on the cycle control commutator 529, its common brush at the left hand end thereof to wire 527, and thence to ground. The relay magnets R73 and R74 control the setting up of what is termed the "cycle controller" which influences the sequence of subsequent multiplying operations. An explanation of the cycle controller will be given shortly. After the entering portion of the cycle, cam contacts CC11 (Fig. 1m) open to deenergize relay magnets R56 and R63 (Fig. 1n).

Upon closure of cam contacts CC27 just prior to the opening of contacts CC11 (see Fig. 9), a circuit is traceable from line 381, relay magnet R57 (left center Fig. 1n), contacts R56d closed at this time, cam contacts CC27, wire 504 (Fig. 1n), cam contacts CC11, to line 382. Magnet R57 closes R57a to provide a holding circuit from line 381, magnet R57, contacts R57a, contacts R25b, now closed, to line 382. This magnet will remain energized throughout the subsequent multiplying operations.

While the reciprocal is being entered, the card is being advanced in the punching unit in position to receive punching of the ultimate result. During such operation of the punching unit, the eject contacts P4 are open to deenergize magnet R46. The feed rack contacts P2 open to deenergize relay magnets R27 and R28. The deenergization of relay magnet R29 upon opening the last column contacts P5 occurs before the magnet R46 is deenergized so that, referring to Fig. 1h, the contacts R29b and R29d close before the contacts R46c and R46b open, thus maintaining the holding circuits for the zero control magnets R70 and the shift control magnets R71.

Relay magnet R57 (Fig. 1n) upon energization during this cycle closes its contacts R57b (right center Fig. 1k) so that, when cam contacts CC5 close, a circuit is completed from line 382, contacts CC5, 57b, R36b (which are still closed at this time), relay magnets SR1, SR2 and R48 in parallel to line 381. Magnets SR1 and SR2 control well known types of stepping switches diagrammatically represented in Figs. 1k, 1m and 1n which for each impulse to the magnets SR1 and SR2 will advance switch arms 532 across a series of arcuately arranged contact segments. Thus, when magnets SR1 and SR2 are energized, the four arms 532 are each stepped from their home position to their first segments which are wired to the No. 1 sockets of the group of sockets generally designated A12, A13, A14 and A15.

Closure of cam contacts CC1 (bottom Fig. 1k) shortly after contacts CC5 have closed will now complete a circuit traceable from line 382 (Fig. 1k), contacts FC26, contacts R20b, CC1, arm 532, No. 1 socket A12, plug connection 533, LH accumulator reset magnet 392LH and to line 381. This will trip the reset clutch so that a resetting of the LH accumulator will take place during the next following cycle. A parallel circuit is completed at this time from line 382, contacts FC26, R20b, wire 534 (Fig. 1m), cam contacts CC2, switch element 532, the No. 1 socket A13, plug connection 535, relay magnet R72, to line 381. A further circuit branches through relay magnets R30 and R11. A parallel circuit is traceable in Fig. 1i from line 382, contacts LH2, LH3, LH4 (now closed), contacts R72f (also closed), wire 545 (Figs. 1i, 1k, 1m, 1n), switch element 532, the 1 spot to the 1 socket A15, connection 537, relay R58 to line 381. Thus, upon the closure of cam contacts CC2 and CC4, the four relay magnets R11, R30, R58 and R72 are energized, closing their respective contacts R11a, R58a and R72e to establish holding circuits for all the magnets through wire 504 and cam contacts CC11 which maintain the magnets energized through the entering portion of the next following cycle.

During this cycle, the card is advanced to punch receiving position and punch card lever contacts 120 open (Fig. 1k), deenergizing the relay magnets R43 and R50. The energization of relay magnet R30 has caused opening of its contacts R30a (center Fig. 1k) to cause deenergization of relay magnet R36 which in turn causes opening of its contacts R36b so that the relay magnets SR1, SR2 and R48 are deenergized and the switch arms of the stepping relays will remain in their 1 position during the following cycle.

*Cycle #4*

Referring to Fig 8, during this cycle the LH accumulator will reset, the MC1 accuumlator is to have the amount therein doubled, that is, the amount 119 standing therein is to be read out and reentered in the accumulator to represent therein the amount 238. A further operation during this cycle is to enter the digit 8 into the ninth denominational order position of the RH acccumulator. Other operations will take place during this cycle to prepare the machine for a subsequent series of multiplying cycles of operation. At the commencement of the cycle, the following relay magnets will be in energized condition (see Fig. 10b):

R11, R30, R39, R40, R41 R42, R51, R57, R58, R70, R71 R72.

The entry of the "8" into the ninth position of the RH accumulator is effected through a circuit traceable from line 383 (Fig. 1h), contacts R23a, the emitter E1 at the 8 time in the cycle, wire 538 (Fig. 1f), relay contacts R58b, plug connection 539, to the plug socket associated with the ninth order accumulator magnet 390RH and thence through this magnet to ground. As a result, an 8 will be entered into the selected order.

To add the amount standing in accumulator MC1 to itself, circuits are completed at differential times to the readout device of this accumulator which are traceable from line 383 (Fig. 1d), emitter E3, wires 524 (Fig. 1c), through the lower part of the readout device MC1RO to wires designated 540, thence through a cable 541 (Fig. 1a), contacts R72a now closed, magnets 390MC1, wire 519, to ground. For the example chosen, the circuit through the units order magnets 390MC1 will be completed at the 9 time and the circuits through the tens and hundreds order magnet will be completed at the 1 time to add 119 to the amount already in the accumulator, leaving it standing at the value 238. It is to be noted that with magnet R72 energized the contacts R72c (Fig. 1a) are open so that the circuits extend only to accumulator MC1 and do not effect accumulator MC2, so that the latter remains at its setting of 119.

Cam contacts CC22 (lower left Fig. 1m) close at the beginning of the cycle to complete a circuit traceable in Fig. 1m from line 382, wire 542, contacts R48a, contacts R30b now closed, cam contacts CC22, relay magnet R20 to line 381. Magnet R20 closes its contacts R20c to provide a holding circuit through contacts R48a which will be maintained for several cycles. As a result, contacts R20b (lower right Fig. 1k) also open so that no further impulses are sent through the cam contacts CC1 to CC4 until these relay contacts are again closed.

When cam contacts CC23 close (lower Fig. 1b), they complete a circuit from line 382, reset contacts of the MC2 accumulator designated MC2c which are normally closed, cam contacts CC23, relay contacts R72d now closed, and four relay magnets R15, R16, R17 and R18 to wire 491 which leads back to opposite side of line (381). The magnets R15 to R18 effect an initial setting of the cycle controller mechanism through their contacts identified by the suffixes a and b in Fig. 1b. These several contacts are in series with contacts generally designated R73 and R74 which in turn are controlled by the cycle control relay magnets of the same designation. It will first be necessary to explain the operation of the R74 contacts.

A mechanical showing of these contacts is made in Fig. 6, where, for example, a magnet R74 is shown. When this magnet is energized, it rocks its spring-retracted armature 543 which has its upper portion in contact with a latch piece riveted to an insulated strip which the lower blade of contacts R74u is riveted to and overlies. This lower blade is spring-biased downwardly so that, when the magnet is energized, the contacts will open. Thereafter, upon one-quarter of a revolution of rotation of shaft 544, one corner of the square shaft will first abut the lower contact blade and lift it to upper position reclosing its contacts, and slightly later another corner edge of the square shaft will intercept a cam projection on the armature and positively shift the armature away from the magnet into latching position. The shaft 544 is geared to the reset mechanism of the MP accumulator with a 1:4 ratio so that it does not operate until the MP accumulator is reset.

From Fig. 8 it is seen that the MP accumulator is not reset until cycle #10 so that, as explained in connection with cycle 3, relay magnets R73 and R74 are selectively energized and the contacts adjusted thereby will remain in position until the MP accumulator is reset. These contacts are shown in the right hand side of Fig. 1b and are identified with suffixes to indicate with which denominational orders they are associated. For example, the two lowermost contacts designated R74u and R74t are operated by the two right hand magnets R74. Further, the two contacts R73u and R73t are operated by the two right hand magnets R73 and so on. Each pair of horizontal contacts may be given one of four relative settings, i. e., (1) they may both remain closed, (2) they may both be open, (3) the left hand contact may be open and the right hand contact closed, or (4) the right hand contact may be open and the left hand closed. These settings are determined by the value of the digits entered into the related orders of the MP accumulator.

Consider, for example, the units and tens orders of the MP accumulator. If no entry is made into either of these accumulators, none of the related R73 and R74 magnets will be energized so that contacts R74u and R74t as well as the contacts R73u and R73t remain closed. If any significant entry is made into either of these two orders, the related magnets R74 will be energized and, assuming a significant entry in both orders, then contacts R74u and R74t will both be opened. If the significant digits entered have the value of either 9, 8, 7, 6 or 3, the related magnet R73 will also be energized and the corresponding contacts R73u or R73t or both will be opened.

According to this procedure for the example chosen where the multiplier amount which is the reciprocal 909090 is entered into the MP accumulator, contacts R74t, R74th, and R74hth will be opened. The contacts R73t, R73th and R73hth will also be open and the remaining R73 and R74 contacts will be in closed condition during this cycle.

Recalling now that magnets R15 to R18 are energized closing their *a* and *b* contacts, it will be seen in Fig. 1b that a circuit is traceable through contacts R18a from line 382, closed contacts R74tm, R74m, R18a and relay magnets Y1m and Y1tm in parallel to wire 497 leading to line 381. A parallel circuit is also traceable from line 382 to contacts R73tm, R73m, R18b and relay magnets Y2m, Y2tm. Magnets Y1m and Y2m close their contacts Y1ma and Y2ma, respectively, to provide a holding circuit through cam contacts FC15 and MC2c back to line 382.

It may be emphasized at this time that the accumulator orders are paired, such as units, tens, hundreds, thousands, etc., so that, when any pair of orders does not receive a significant entry, the Y1 and Y2 magnets of that pair are energized when the R15 to R18 magnets receive current.

When cam contacts CC4 (Fig. 1n) close at the beginning of the cycle before relay magnet R20 is energized, a circuit is traceable from line 382 (Fig. 1k), contacts FC26, R20b, wire 534 (Figs. 1m and 1n), contacts CC4, wire 545 (Figs. 1m, 1k, and 1i), contacts R72f, relay magnets R34 and R35 to line 381. As a result, contacts R35b are closed, providing a holding circuit from line 381, magnets R34, R35, contacts R35b, contacts R19a, wire 547 (Fig. 1k), contacts FC26 to line 382. When cam contacts CC11 (Fig. 1m) open, relay magnet R58 (Fig. 1n) will be deenergized.

At the end of the cycle when contacts CC10 close (right Fig. 1a), a circuit is traceable from line 382 (Fig. 1b), wire 548 (Fig. 1a), contacts CC10, relay contacts R34a now closed, upper contacts Y1ub, magnets CS1 to line 381. Magnets CS1 close a pair of contacts CS1a to provide a holding circuit therefor through cam contacts CC9. When cam contacts CC18 (Fig. 1b) close, a circuit is traceable from line 383, contacts CC18, R34b, lower contacts Y1ud, the tens order column of the multiplier readout device MPRO, and (with this order standing at 9) through the multiplier selection plate magnets XL4 and to ground. No circuit is completed through the units order of the readout device as this position is set at zero.

In explanation of the wiring of the MPRO device, it may be stated that, when the units order readout brush is standing at 1, magnet XR1 is energized; when it is standing at 2 or 3, magnet XR2 is energized; when it is standing at 4, 8 or 9, magnet XR4 is energized; when it is standing at 5, 6 or 7, magnet XR5 is energized. When the readout brush in the tens order is standing at 1, magnet XL1 is energized; when it is standing at 2 or 3, magnet XL2 is energized; when it is standing at 4, 8 or 9, magnet XL4 is energized, and when it is standing at 5, 6 or 7, magnet XL5 is energized.

The foregoing indicates the manner of selection of the multiplier selecting magnets for the first of two multiplying cycles that may be required for each of the digits. For the second of these two multiplying cycles the selection will be as follows: With the units order brush standing at 3 or 6, magnet XR1 is energized; when the brush is standing at 7, the magnet XR2 is energized; with the brush standing at 8, magnet XR4 is energized, and with the brush standing at 9, magnet XR5 is energized. With the tens order brush standing at the same digital positions, the corresponding XL magnets will be energized.

*Cycle #5*

Referring to Fig. 8, during this cycle four times the multiplicand 119 is to be entered into the LH accumulator directly from the readout device of the MC1 accumulator. At the beginning of the cycle, the multiplier selection magnet XL4 is energized in response to the setting of the tens order of the MPRO device at the digit 9. Magnets CS1 are also energized as well as the following relay magnets:

R20, R34, R35, R39, R40
R41, R42, R51, R57, R70, R71

The magnet XL4 energized during the preceding cycle has caused closure of a set of contacts (Fig. 1c) designated XL4a. This is a group of contacts usually employed in multiplying machines. They are electrically tripped upon energization of the controlling magnet and mechanically restored after circuits have been completed therethrough, so that during the entering part of the present cycle these XL4a contacts are closed. Magnet CS1 closes a set of contacts generally designated CS1c (Fig. 1e) and a further set of contacts generally designated CS1d (Fig. 1f).

With contacts XL4a (Fig. 1c), and contacts CS1c (Fig. 1e) closed, circuits will now be completed to enter four times the multiplicand into the LH accumulator. These circuits are traceable from line 383 (Fig. 1d), emitter E3, wires 524 (Fig. 1c), to the MC1RO device whose readout commutators and segments are wired in accordance with the four times table to direct impulses to a group of wires designated 549, contacts XL4a, cable 550 (Fig. 1e), a group of wires 551, contacts CS1c, thence through a group of wires 552 to the accumulator magnets 390LH, and thence to ground.

As a result, the amount 476 is entered into the LH accumulator in the orders indicated in Fig. 8. While this entry is taking place, relay magnet CS1 has also closed a pair of contacts designated CS1e (Fig. 1b) and also a pair of contacts designated CS1f. When contacts CC7 (Fig. 1b) close while the amount is being entered into the LH accumulator, a circuit is completed from line 382, cam contacts CC7, CS1e, control magnets Y1u and Y1t to line 381. As a result, contacts Y1ua close to provide a holding circuit through contacts FC15. A second pair of contacts Y1uf is also closed but these have no effect at this time.

When cam contacts CC9 (Fig. 1a) open, the magnets CS1 will be deenergized. However, when cam contacts CC10 close shortly thereafter, the magnet CS1 will be reenergized through a circuit traceable from line 382 (Fig. 1b), wire 548, contacts CC10, R34a, left hand contacts Y1ub which are now closed due to energization of magnet Y1u, right hand contacts Y2ub, magnets CS1 to ground. As before, the energization of the CS1 magnets will cause closure of contacts CS1c (Fig. 1e).

When cam contacts CC18 (center Fig. 1b) close still later in the cycle, a circuit is traceable from line 383, contacts CC18, R34b, upper contacts Y1ud closed due to energization of magnet Y1u, lower contacts Y2ud still closed, the tens order readout brush of the MPRO device which is standing at 9, then to the mutliplier selection magnet XL5 and to ground. It is to be noted that no circuits can be completed to the XR magnets as the units order brush in the MPRO device is standing at zero. A setting is thus made to control multiplying in the next following cycle.

During this cycle the card carriage rack 181 (Fig. 3a) moves to its home position to close contacts P1, so that relay magnet R52 (Fig. 1i) is reenergized through a circuit from line 382, contacts P1, R40c, stop key contacts 276, magnet R52 to line 381. Upon return of the rack 181, the contacts again close to energize the magnet R27 under control of contacts CC13 so that, when contact P1 closes at the very end of the return of the rack, the circuit to energize relay magnet R52 will be completed.

*Cycle #5a*

During this cycle as seen from Fig. 8, 5 times the multiplicand is to be entered into the same orders of the LH accumulator as 4 times the multiplicand was entered during the previous cycle. At the beginning of this cycle the same relay magnets are energized as at the beginning of the previous cycle. During the entering portion, circuits are completed from line 383 (Fig. 1d), emitter E3, wires 524, the readout device MC2RO whose segments and commutators are wired in accordance with the 5 times table to a group of wires designated 553, contacts XL5a closed as a result of the energization of magnet XL5, cable 550 (Figs. 1c and 1e), wires 551, contacts CS1c, wires 552 to the LH accumulator magnets 390LH, thence to ground.

The closing of contacts CC8 (Fig. 1b) (before contacts CC7 close) will complete a circuit from line 382, contacts CC8, contacts CS1f, Y1uf, magnets Y2u and Y2t to line 381. Magnet Y2u closes its contacts Y2ua to provide a holding circuit through contacts FC15.

When contacts CC10 close near the end of this cycle, a circuit is traceable from line 382 (Fig. 1b), wire 548, contacts CC10, R34a, lower contacts Y1ub, lower contacts Y2ub, contacts CC15 (closed concurrently with CC10), upper closed contacts Y1hb, magnets CS2 to ground. Magnet CS2 closes its related contacts in the same manner as magnets CS1 had previously, to effect closure of contacts CS2c (Fig. 1e), and CS2d (Fig. 1f).

*Cycle #5b*

This cycle is the same as cycle 5 with 4 times the multiplicand entered into the LH accumulator and with a denominational displacement as indicated in Fig. 8, the entering circuits being the same as for cycle 5 with the exception that they extend through contacts CS2c in Fig. 1e instead of contacts CS1c. When cam contacts CC7 (Fig. 1b) close during this cycle, relay magnets Y1h and Y1th are energized through now closed contacts CS2e and, when contacts CC10 again close after contacts CC9 have opened to deenergize magnet CS2 (Fig. 1a), the magnets will be reenergized through the circuit to contacts CC10, R34a, lower contacts Y1ub, lower contacts Y2ub, CC15, lower contacts Y1hb now closed, upper contacts Y2hb to magnet CS2. Also, when contacts CC18 (Fig. 1b) close, a circuit is completed to energize the XL5 magnet through a circuit from contacts CC18, R34b, upper contacts Y1ud, upper contacts Y2ud, upper contacts Y1hd now closed, lower contacts Y2hd, readout brush of the MPRO device standing at 9 in the thousands order, to the XL5 magnet.

*Cycle #5c*

This cycle is the same as cycle 5a with 5 times the multiplicand entered into the LH accumulator with a denominational shift, the entering circuits being the same except that they pass through contacts CS2c (Fig. 1e) instead of contacts CS1c.

*Cycles #5d and #5e*

These two cycles are the same as cycles 5b and 5c, respectively, except that during cycle 5d the magnets CS3 are energized instead of magnets CS2 under control of the contacts of the Y magnets. During cycle 5e, all of the Y magnets will have been energized so that, when contacts CC10 (Fig. 1a) close, a circuit is traceable from these contacts serially through all the lower Y1 and Y2 contacts suffixed b to energize relay magnet R21. This magnet closes its contacts R21a (center Fig. 1k) so that when cam contacts CC12 close a circuit is traceable from line 382, contacts CC12, R21a, FC11, reset magnets 392MC1 and 392MC2 to line 381. Energization of these magnets will cause the MC1 and MC2 accumulators to reset in the next following cycle. A branch circuit extends from contacts R21a through relay magnet R76.

Also during this cycle closing of contacts R21b (Fig. 1m) will complete a circuit from line 382, wire 542, contacts R21b and relay R24 to line 381. The relay closes its contacts R24a to establish a holding circuit through wire 504 and contacts CC11.

Magnet R76 closes its contacts R76b (bottom Fig. 1f) and as this relay is of the magnetically tripped and mechanically restored type, the contacts remain closed during the entering portion of the next cycle.

*Cycle #6*

It the beginning of this cycle the following relays are in energized condition.

R20  R24  R31  R34  R35
     R39       R40  R41
R42  R51       R52  R57
R70  R71 and the Y1 and Y2 relays.

A transfer of the amount in the RH to the LH accumulators now takes place due to closure of contacts R16b through circuits traceable from line 383 (Fig. 1h) upper contacts R23a, emitter E1, wires 512 and through the brushes of the readout device RHRO to connections 554 (Fig. 1f), contacts R16b, cable 555 (Fig. 1e) magnets 390LH to ground. Thus the amount standing in the RH accumulator is transferred directly to the LH accumulator.

Shortly after the beginning of the cycle, cam contacts CC14 close to momentarily energize relay R19 through a circuit traceable from line 381 (left Fig. 1m) relay R19, cam contacts CC14, contacts R24b (now closed) wire 504 and contacts CC11 to line 382. Relay R19 closes its contacts R19b (upper left Fig. 1k) to complete a circuit from line 381, relay R36 contacts R19b, R30a, R65a to line 382.

At the same time relay R19 opens its contacts R19a (lower left Fig. 1i) so that relays R34 and R35 become deenergized which in turn prevent further multiplying operations by opening their contacts R34b (Fig. 1b), R34a (Fig. 1a).

The resetting of the MC accumulators during this cycle causes operation of the contacts MC2a, MC2b, MC2c (Fig. 2) of which contacts MC2c (lower right Fig. 1b) open to deenergize the cycle control relays that had been set up.

During the latter part of the cycle, closure of cam contacts CC5 (right Fig. 1k) will complete a circuit from line 382, contacts CC5, R57b, R36b, to energize relay magnets SR1, SR2 and R48 in parallel. This results in advance of the stepping switch arms 532 (Figs. 1k and 1m) to step 2, Magnet R48 opens its contacts R48a (left Fig. 1m) to deenergize relay R20 which thereupon permits its contacts R20b (lower right Fig. 1k) to again close and supply current to the stepping switch arms 532.

Now when contacts CC1, CC2, CC3 and CC4 close still later in this cycle circuits are completed to several relays as follows. Magnet 392RH is energized through one circuit traceable from line 382, contacts FC26, R20b, CC1, arm 532, number 2 socket A12, connection 557 magnet 392RH and line 381. This is the reset magnet of the RH accumulator and its tripping at this time will cause the RH accumulator to be reset in the next following cycle.

A parallel circuit is concurrently traceable from the wire 534 (Fig. 1m) contacts CC2, arm 532 of SR1, the 2 socket A13, connection 558 (Fig. 1k), to magnet 392LH and line 381. Accordingly the LH accumulator will reset in the next cycle with the RH accumulator.

A further circuit is traceable from the wire 534 (Fig. 1m) contacts CC3, arm 532 of SR2, the 2 socket A14, connection 559 (Fig. 1k) relay magnet R79 to line 381. Magnet R79 closes its contacts R79a to provide a holding circuit through wire 504 (Fig. 1m) and contacts CC11. It also closes a set of contacts R79b (Fig. 1a) to prepare circuits for transferring the amount in the LH accumulator to the MC accumulators in the next following cycle.

From the 2 socket A14 (Fig. 1m) a circuit also branches through connection 560 to a relay R23 to line 381. Relay R23 closes its contacts R23b to set up a holding circuit through contacts CC11.

A circuit is also traceable at this time from contacts CC4 (Fig. 1n) related arm 532, the 2 socket A15, connection 561 to energize relay R59 which closes its contacts R59a to set up a holding circuit through contacts CC11.

*Cycle #7*

In this cycle the amount in the LH accumulator is to be transferred in the form of a complement to the two MC accumulators and the LH and RH accumulators reset. It may be pointed out that, with the type of accumulator employed, complementary readout and reset may occur in the same cycle as the accumulator settings are sensed in the order 1, 2, 3, 4, etc., and the wheels are picked up for advance to zero in the same order, but slightly later in the cycle.

The complement transfer circuits are traceable from line 383 (Fig. 1h) lower relay contacts R23a, emitter E2 which emits complemental impulses to the group of wires 512 (Fig. 1g) thence through the readout brushes in the LH accumulator set at 9081817 to the plug sockets A24 in the positions numbered 3 to 9 multiple connections 526 to the plug sockets B24 (Fig. 1a), contacts R79b (now closed) contacts R61b, R63b, R72c to the accumulator magnets 390MC1. Through the cable 522, the corresponding magnets 390MC2 are also energized.

In this manner the 9's complement of the amount in the seven selected orders of the LH accumulator are entered in the first seven places of the MC accumulators as indicated in Fig. 8. It is necessary to add a 1 in the lowest order to change the value to a tens complement. For this purpose the well known carry lever latch magnets in the units orders of the MC1 and MC2 accumulators are provided. When these magnets are energized they trip their carry levers so that a 1 is entered during the carry part of the cycle.

In the circuit diagram (Fig. 1h) these magnets are indicated at 563 and with a circuit connection 564 made; a circuit is completed from line 383, lower contacts R23a, 9 spot of emitter 2, connection 564, magnets 563 to ground. This takes place when emitter E2 is rendered effective and will result in entering the extra digit in the units order of the two MC accumulators.

At the end of this cycle the MP accumulator still contains the reciprocal of 11 namely 909090 while the MC accumulators contain the result of evaluating the term

[2−1.19 (.909090) which is .918183]

It is to be noted that in effecting this solution it was carried out as though it were written

[(10−(8+1.19 (.909090)]

In the next cycle the amounts .909090 and 918183 are to be multiplied to obtain the first intermediate reciprocal R1. Toward the end of the present cycle, cam contacts CC5 effect a further advance of the stepping relays to advance them to their number 3 positions through the circuit already traced on Fig. 1k.

Near the end of the cycle relay R64 is energized through a circuit from contacts CC4 (Fig. 1n) arm 532, 3 socket A15, connection 565 and relay R64 to line 381. The relay closes its contacts R64a to provide a holding circuit through the MP reset contacts MP1 which keep relay R64 energized until the MP accumulator is reset. The relay R64 closes a pair of contacts R64b (left center Fig. 1k) to connect magnet 392MP in parallel with magnets 392MC1 and 392MC2 so that when the MC accumulators are next reset the MP accumulator will be reset therewith.

Relays R72, R30 and R11 are energized through a circuit from wire 534 (Fig. 1m) contacts CC2, arm 532, the 3 socket A13, connection 568, relay R72 to line 381. A wire also runs to relays R30 and R11 to energize these relays all of which set up holding circuits through cam contacts CC11 as already traced.

*Cycle #8*

This is a doubling cycle, the same as cycle 4, during which the amount in accumulator MC1 is added to itself as indicated in Fig. 8. At the beginning of the cycle, the following relay magnets will be in energized condition (see Fig. 10c).

| R11 | | R30 | R31 | R39 | R40 | R41 |
| R42 | R51 | R52 | | R57 | R64 | R70 |
| R71 | | R72 | | | | |

As the circuits for doubling have already been traced under "Cycle No. 4" the same will not be repeated here. This cycle differs in that relay R58 is not energized and the "8" is accordingly not entered in the RH accumulator as it was in cycle No. 4.

Cam contacts CC22 (lower left Fig. 1m) close and cause energization of relay R20 as before and opens its contacts R20b (lower right Fig. 1k) to prevent further circuits to the cam contacts CC1 to CC4. Also the relays R15 to R18 (Fig. 1b) are energized to effect the initial setting of the cycle controller mechanism for the multiplier 909090 as for cycle No. 4. In addition the relays R34 and R35 are also energized as already explained and as a result the appropriate Y and CS magnets are energized to control multiplying in the following cycles.

Cycles #9 to 9E

These cycles correspond to cycles Nos 5 to 5E and during them multiplying takes place as explained already to obtain the sub products in the RH and LH accumulators but inasmuch as the units and alternate higher orders of the multiplier are zero there are no entries in the RH accumulator.

Cycle #10

For the example chosen, this is in effect a dummy cycle to transfer from the RH to the LH accumulator and corresponds to cycle No. 6. At the beginning of the cycle the following relays are in energized condition (see Fig. 10c).

R20  R24  R34        R35  R39
R40  R41  R42  R51  R52  R57  R31  R64
R70  R71  and the relays R76.

As in cycle No. 6, relays R19 and R36 are energized and relays R34 and R35 deenergized.

The resetting of the MC accumulators will be accompanied by resetting of the MP accumulator because of the now closed condition of contacts R64b (Fig. 1k). The resetting of the MP accumulator will cause opening of the reset shaft contacts MPI (bottom Fig. 1n) to deenergize the relay R64.

As before, cam contacts CC5 (right Fig. 1k) close in the latter part of the cycle to energize relays SR1, SR2 and R48 in parallel, the latter causing deenergization of relay R20 which in turn results in the advance of the stepping relays to the No. 4 positions.

Now when the contacts CC1 to CC4 close, a circuit is traceable from line 381, relay R63 (lower left Fig. 1n), a plug connection 569, contacts R60a (lower), connection 570, 4 socket A15, and contacts CC4 to line 382. Contacts R63c close to set up the holding circuit through wire 504 and contacts CC11 (Fig. 1m).

The LH accumulator reset magnet 392LH will not receive current during this cycle as it did in cycle No. 6, inasmuch as it will be recalled the impulse was sent through the #3 spot of the stepping relay and this spot is not connected now.

Relay R62 will be energized through a circuit from line 381, relay R62 (lower left Fig. 1n), connections 571 and 570, the 4 socket A15 and to line 382, through the stepping relay. Contacts R62a close to set up the holding circuit through wire 504 and contacts CC11.

Relay R22 (lower left Fig. 1m) is also energized at this time through a circuit from line 381, relay R22, connection 572, contacts R60c, connection 579, 4 socket A14 to line through the stepping relay. Contacts R22a set up the usual holding circuit. A resetting of the RH accumulator is initiated through a circuit from CC1 (Fig. 1k), 4 spot A12 of the stepping relay, connection 574, reset magnet 392RH to line 381. As a result, the RH accumulator will be reset in the following cycle.

Cycle #11

At the beginning of this cycle, all the accumulators except SP, RH and LH are clear and the latter contains the first R1 value 834710983470 (see Fig. 8). The six highest orders of this number are now to be transferred to the MP accumulator, the divisor 119 is again transferred from the SP to the MC1 and MC2 accumulators, and a series of computations like those carried out through cycles 4 to 10 are now repeated.

The transfer of 119 is effected through the same circuits as traced for cycle #3. The transfer of the amount in the six highest orders of the LH accumulator is effected through the following circuit connections from line 383 (Fig. 1h), contacts R23a, emitter E1, wires 512 (Fig. 1g), read-out device LHRO of the LH accumulator to the 7 to 12 sockets A24, plug connections 573 (upper left Fig. 1b), contacts R62b (now closed) to the MP accumulator magnets 390MP. The values in the 7—12 orders of the LH accumulator are thus directly entered in the MP accumulator.

Concurrently, the first cycle control relays R74 will be energized in the tens to hundred-thousands order positions and the second cycle control relays R73 will be energized in the hundreds, tens of thousands and hundreds of thousands order positions.

Briefly, the following R73 and R74 contacts are shifted in Fig. 1b, R74t, R74h, R74th, R74tth, and R74hth and R73h, R73tth, and R73hth. These will control the cycle control Y relays for multiplier selection in the subsequent Cycles #13 to 13d.

With relay R22 energized as explained in the previous cycle, its contacts R22b (lower left Fig. 1m) will be closed so that upon closure of cam contacts CC6 the three relay magnets R65, H1 and H2 will be energized. Relay R65 opens its contacts R65a (top center Fig. 1k), to attempt to deenergize relay R36 but contacts R63d are now closed so relay R36 remains energized.

The relays H1 and H2 when energized release the holding pawls to effect a restoration of the SR1 and SR2 stepping relays so that they return to their initial starting positions. Later in the cycle when contacts CC5 (Fig. 1k) again close, a circuit is completed to energize the magnets SR1 and SR2 to bring the stepping relays to their #1 positions.

With the arm 532 of the first stepping relay SR1 in its 1 position, the circuit through the LH reset magnet 392LH as already traced (Fig. 1k) is completed, so that the LH accumulator will be reset in the next following cycle.

Cycle #12

Inspection of Fig. 8 will show that the operations for cycle 12 are the same as for cycle 4 and reference may be had to the explanation of the earlier cycle for a tracing of the circuits involved.

Cycles 13 to 13d

These multiplying cycles correspond to the prior cycles 5 to 5e with, of course, different multiples of the multiplicand entered into the LH and RH accumulators, and reference may be had to the explanation of the earlier cycles for the circuits involved in cycle controlling column shifting and entering.

Cycles 14 and 15

RH to LH transfer takes place herein as well as MC resetting just as in cycle 6 and then in cycle 15 the complement of the LH amount is entered into the MC accumulators and LH is reset as in cycle 7.

Cycles 16 to 21

These cycles (Fig. 8a) are repetitious of previous cycles with the new multiplicand and the second multiplier to obtain the R2 value of 840299 which is then multiplied by 119 to obtain the result 899995581 in Cycle 21 as a result of the RH to LH transfer.

Cycle 22

During this cycle, which corresponds to cycles 7 and 15, the complement of the amount in the LH accumulator is transferred to the MC1 and MC2 accumulators, through circuits already traced for cycle 7. A test is made at such time to determine the presence of nines in 6, 7 and 8 order positions of the LH accumulator, through circuits traceable as follows.

From line 383 (Fig. 1h), lower contacts R23a, the complement emitter E2, its zero spot, the wire 512 extending to the 9 readout segments of the LH accumulator (Fig. 1g), the plug sockets A24 in the 6, 7 and 8 positions, connections 576 (Fig. 1h), now closed relay contacts R59b (closed as explained in Cycle 6 and held through cycle 7), check relays C1, C2 and C3, a commutator 577 which completes the circuit only at the "0" time, and thence to ground.

During any of the prior transfer cycles when a 9 stood in the 6, 7 or 8 orders of accumulator LH, one or more relays C1, C2 or C3 were energized but unless all are energized, it is of no effect. It is only when all three are concurrently energized that the change in operations now to be explained takes place and it will be noted that the repeated computations already explained continue until the condition now present arises.

Energization of all three check relays C1, C2 and C3 will cause closure of related contacts C1a, C2a, and C3a (center Fig. 1n) to immediately complete a circuit through relay R60 which by closing its contacts R60b sets up a holding circuit through relay contacts R61c.

Cycles 23 to 25

These cycles continue as indicated in Fig. 8a in correspondence with cycles 8 to 10 to obtain the product of 1000045 and 840299 which is 840336813455. During Cycle 25, the MC and MP accumulators are reset as in Cycle 10 and at such time the stepping relays are in their 4 positions. As explained for cycle 10, the relay R63 was energized at such time through circuits previously traced. These circuits however are not now completed and relay R61 will be energized in place of relay R63, through the following circuit: from line 381, relay R61 (lower left Fig. 1n), connection 578, upper contacts R60a, (shifted as a result of the completion of the check relay circuit through relay R60), connection 570, 4 socket A15 of the step relay and contacts CC4 to line 382.

Relay R61 closes its contacts R61d to set up a holding circuit through wire 504 and contacts CC11. Due to the energization of relay R60, its contacts R60c (Fig. 1m) are open so that relay R22 is not energized at this time and consequently the contacts R22b are also open to prevent energization of H1, H2 and H65 with the result that the stepping relays are not restored. Instead, they advance to their 5 positions upon the next stepping impulse from cam contacts CC5.

Cycle 26

At the beginning of this cycle, the following relays are energized.

| R36 | R39 | R40 | R41 | R42 |
| R52 | R57 | R61 | R62 | R70 |
| R71 | | | | |

The MP and MC accumulators reset as before in the previous cycle 25. The dividend 39627 is transferred from accumulator SP to the MC1 and MC2 accumulators, through circuits traceable from line 383 (Fig. 1h), contacts R23a, emitter E1, wires 512 (Fig. 1g), SP accumulator readout device SPRO to sockets A9 in positions 1 to 6 connections 580 (Fig. 1a), contacts R71a related to the #5 shift control relay R71, connections 581, contacts R61a, R63b, cable 522 to magnets 390MC2 and through contacts R72c to magnets 390MC1.

The energization of the 5 relay R71 was explained in connection with cycle #1 as a result of testing the dividend for magnitude and the contacts R71a of this 5 relay R71 are arranged to enter the dividend with a single order displacement to the left, as indicated in Fig. 8a.

The amount 840336 is transferred to the MP accumulator as for cycle #11 and the RH accumulator is reset. Resetting of the LH accumulator is initiated through a circuit from line 381 (Fig. 1k), reset magnet 392LH, connection 582, the 5 socket A12 of the stepping relay and to line 382 as before. Thus, in the following cycle the LH accumulator will be reset.

Relay R64 will be energized through a circuit from line 381 (lower left Fig. 1n), relay R64, connections 565 and 583 to the 5 socket A15. It closes its contacts R64a to hold through contacts MP1 as before.

Relay R66 will also be energized through a circuit from line 381, relay R66, connections 584, 565 and 583 to the 5 socket A15. It closes its contact R66a to hold through wire 504 and contacts CC11. Resetting of the SP accumulator is also initiated in this cycle through a circuit from line 381 (Fig. 1k), magnet 392SP, connection 585 (Fig. 1m), 5 socket A13 of the stepping relay to line 382.

Cycle 27

The LH and SP accumulators reset in this cycle and the amount in accumulator MC1 is doubled. A ½ correction takes place in the RH accumulator which involves entering a 5 in the sixth denominational order. This is effected through a circuit from line 383 (Fig. 1h), contacts R23a, emitter E1 at the 5 spot, a wire 586 (Fig. 1f), contacts R66b, connection 587 to the 6RH accumulator magnet 390RH and thence to ground.

Cycles 28 to 28e

These multiplying cycles are the same as cycles 5 to 5e and during the same the RH and LH components are obtained in the RH and LH accumulators respectively.

Cycle 29

During this cycle relay R36 becomes energized to cause the circuits for advancing the stepping relays to be completed resulting in their advance to their 6 positions. RH to LH transfer takes place as for Cycle 10 and the MC and MP accumulators are reset. A reset initiating impulse is sent to the RH accumulator reset magnet through a circuit from line 381 (Fig. 1k), magnet 392RH, connection 588, the 6 socket A12, stepping relay to line 382. Thus, during the following cycle the RH accumulator will reset.

Cycle 30

Figure 10C:
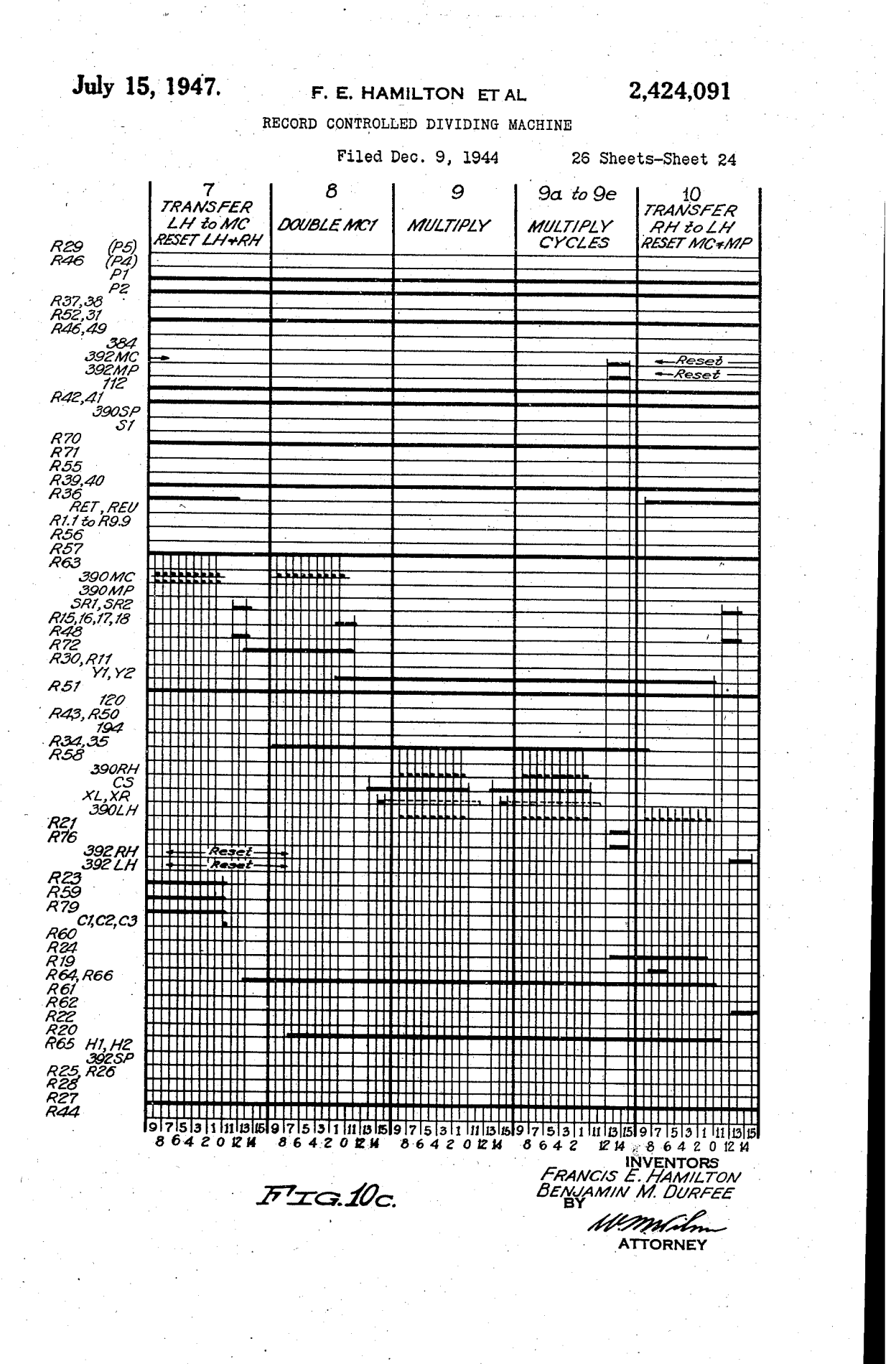
Figure 10D:
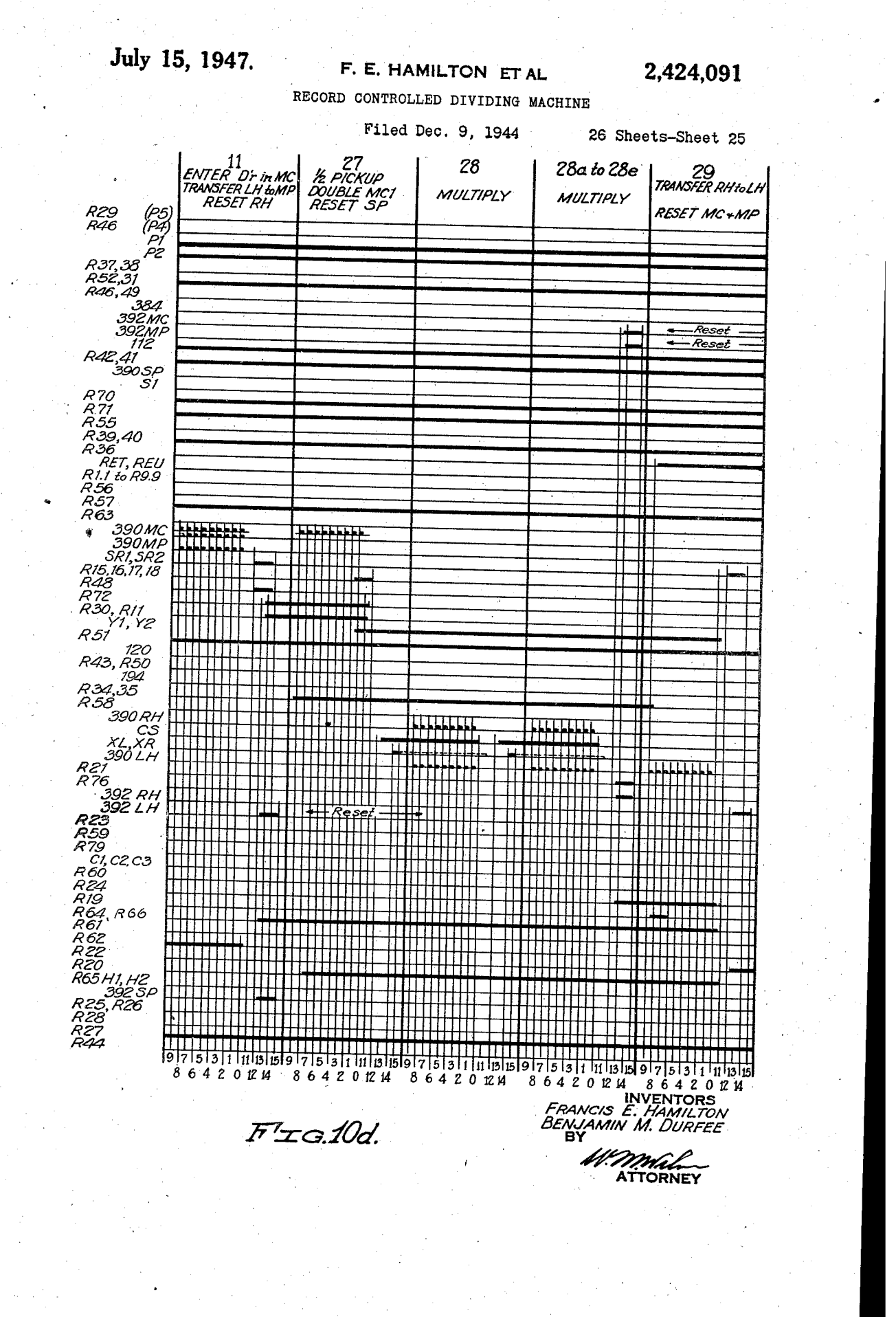

At the beginning of this cycle the following relays are in energized condition (see Fig. 10c).

| R22 | R36 | R39 | R40 | R52 | R31 |
| R41 | R42 | R57 | R70 | R71 | R27 |

Relays R25, R26 become energized (upper left Fig. 1n) through a circuit from line 381, relays R26, R25, connection 589, the 6 socket A15 and stepping relay to line 382. Relay R25 opens its contacts R25b (center Fig. 1n) to deenergize the relay R57 which opens its contacts R57b (Fig. 1k) to prevent further impulses to step the SR1 and SR2 relays.

Relay R65 is energized through a circuit from line 381 relay R65 (Fig. 1m) contacts R22b and cam contacts CC6 to line 382. As a result contacts R65a (Fig. 1k) open to deenergize relay R36.

In parallel with relay R65 are relays H1 and H2 which effect restoration of the stepping relays to their home position. Later in the cycle when contacts CC11 (Fig. 1m) open, relay R22 is deenergized.

Also during this cycle the RH accumulator resets to zero. The relay R25 has closed its contacts R25c (Fig. 1n) to establish a holding circuit from line 381, relay R25, contacts R25c, wire 590 (Figs. 1m, 1k and 1i) LH accumulator reset contacts LH1 to line 382. The relay R25 will accordingly remain energized until the LH accumulator is again reset.

*Quotient punching*

The machine is now ready to punch the amount standing in the LH accumulator back into the card. This amount represents the quotient of the original dividend and divisor amounts, but the digits of the quotient have no denominational significance. Punching will take place from only columns 7 to 12 inclusive of the LH accumulator in which columns the number 333000. now stands. This number may represent 3.33000, 33.3000, 333.000, 3330.00, etc., depending upon the initial size of the factors and in punching the quotient into the record card it is desirable to have the decimal point in the same position for any size quotient. Thus if punching is to occur in a field of the card from columns 9 to 20 punching may take place in any of the following ways.

| Card Columns | 8 | 9 | 10 | 11 | 12 | 13 | 14 | 15 | 16 | 17 | 18 | 19 | 20 |
|---|---|---|---|---|---|---|---|---|---|---|---|---|---|
| | 3 | 3 | 3 | 0 | 0 | 0. | | | | | | | |
| | | 3 | 3 | 3 | 0 | 0. | 0 | | | | | | |
| | | | 3 | 3 | 3 | 0. | 0 | 0 | | | | | |
| | | | | 3 | 3 | 3. | 0 | 0 | 0 | | | | |
| | | | | | 3 | 3. | 3 | 0 | 0 | 0 | | | |
| | | | | | | 3. | 3 | 3 | 0 | 0 | 0 | | |

In the present case of a 5-place dividend and 3-place divisor the result should be punched as 333.000 or into card columns 12 to 17 inclusive. As preliminary plug connections 594 (Fig. 1g) are made from the sockets of the LHRO device in columns 7 to 12 inclusive to similarly numbered sockets in Fig. 1d. Further plug connections 591 are made from the punch column selector sockets of columns 9 to 20 to similarly numbered sockets A37 (Fig. 1d).

During computing cycles the card has advanced to present its column 8 to the rear of punches 219 (Fig. 3) and after relay R25 has been energized the machine pauses in its operation whereupon the operator will repeatedly depress the space key of the punch which in the well known manner will mechanically close contacts 408 (Fig. 1g) to energize the punch magnet 409 through a circuit from line 382, contacts R25d, 408 and magnet 409 to line 381. Magnet 409 will cause escapement of the card without punching until the first column is reached in which punching is to be effected. For the present example, where the first digit is to be punched in column 12 of the card, when the card arrives in this position a circuit is immediately completed from line 382, contacts R25d, 215, common strip 220, brush 223, 12 segment 221, plug connection 591 to the 12 socket A37 (Fig. 1d) contacts R71a of the 10 relay R71 second from the left, contacts R71a of the 5 relay R71 first on the left, the 12 socket to connection 594 (Fig. 1g) cable 592 to the readout segment of the twelfth column, which has its brush set at 3, the 3 wire of a group 593 cable 594, the 3 punch selecting magnet 407 to line 381. As a result a 3 is punched in column 12 of the card and the card automatically spaces to column 13 where a similar circuit is traceable through the 13 column of the accumulator to punch a 3 in card column 13 of the card and so on.

Inspection of the circuit arrangement in the upper right hand corner of Fig. 1d will show that for the machine capacity of six place dividends and three place divisors, the digit in column 12 of the accumulator will be punched in card Column 9 for a 6 place dividend and a 1 place divisor (6, 8 relays R71 energized), in
Column 10 for a 5 place dividend and a 1 place divisor (5, 8 relays R71 energized),
Column 10 for a 6 place dividend and a 2 place divisor (6, 9 relays R71 energized),
Column 11 for a 4 place dividend and a 1 place divisor (4, 8 relays R71 energized),
Column 11 for a 5 place dividend and a 2 place divisor (5, 9 relays R71 energized),
Column 11 for a 6 place dividend and a 3 place divisor (6, 10 relays R71 energized),
Column 12 for a 3 place dividend and a 1 place divisor (3, 8 relays R71 energized),
Column 12 for a 4 place dividend and a 2 place divisor (4, 9 relays R71 energized),
Column 12 for a 5 place dividend and a 3 place divisor (5, 10 relays R71 energized),
Column 13 for a 2 place dividend and a 1 place divisor (2, 8 relays R71 energized),
Column 13 for a 3 place dividend and a 2 place divisor (3, 9 relays R71 energized),
Column 13 for a 4 place dividend and a 3 place divisor (4, 10 relays R71 energized),
Column 14 for a 1 place dividend and a 1 place divisor (1, 8 relays R71 energized),
Column 14 for a 2 place dividend and a 2 place divisor (2, 9 relays R71 energized),
Column 14 for a 3 place dividend and a 3 place divisor (3, 10 relays R71 energized).

The card carriage is then escaped to the last column position to close contacts P5 (Fig. 1i) and energize relay magnet R29 which opens its contacts R29b and R29d (Fig. 1h) to deenergize the shift control relays R71 and the zero control relays R70.

Contacts R29c (bottom Fig. 1g) also close to energize the eject magnet 232 causing ejection of the punched card and in so doing contacts P3 are closed to prepare a path to later energize the trip magnet 194 when contacts R43a (upper) close.

The eject contacts P4 also close to energize relay R46 (Fig. 1i) which in turn by closing its contacts R46a (Fig. 1k) will complete the circuit to energize the relay R44 whose contacts R44a in turn complete the circuit to the LH accumulator reset magnet 392LH, when cam contacts CC1 close.

The LH accumulator thereupon resets during the next cycle and the machine comes to rest with only c cams in operation and with relays R29, R46, R52, R31, R46, R49, R42, R41, R39 and R40 energized as at the beginning of cycle 1. The MC, MP and SP accumulators are also in reset condition. The second card has been advanced to the position where it has closed card lever contacts 112. The operator now resumes operation by closing the start key contacts 275 (Fig. 1i) to energize relays R37, R38 which cause energization of the feed clutch magnet 384 and relay S1 so that as the second card now passes brushes 109 the new factor will be entered in accumulator SP as in cycle 1 and from this point on the sequence of events is repeated.

Elimination of interpolating cycles

Where the divisor reciprocal is selectable directly from the reciprocal table, the interpolating cycles 4 to 26 will be eliminated and the divisor will be multiplied by the selected reciprocal. The entire series of operations as traced hereinabove will only occur where a divisor has a significant digit in all three orders or where there is a significant digit in the units and hundreds orders and a zero in the tens order. In all other cases elimination of Cycles 4 to 26 occurs. Thus, representing significant divisor digits as X, for numbers such as XXX and X0X all cycles occur and for numbers 00X, 0X0, 0XX, X00 and XX0 no interpolating cycles are required.

Referring to Fig. 1h, it will be recalled that during Cycle 1 relays R70 numbered 8, 9 and 10 were energized according to the presence of significant digits in the divisor so that for the two cases where all cycles are required, the 8 and 10 relays are energized and for others, only one of them or neither is energized. In Fig. 1k (center) are shown contacts R70e controlled by these 8 and 10 relays R70 connected in parallel.

If both these contacts R70e are open, nothing occurs and events take place as explained.

If either remains closed a circuit is traceable in Cycle 2 from line 382, contacts CC24, R55d (closed at the time, see Fig. 10a) contacts R70e, R36b (closed) stepping relays SR1 and SR2. Later in the cycle when contacts CC25 close (see Fig. 9) the circuit is repeated to again energize SR1 and SR2 to advance the stepping relays to their 2 positions. In Cycle 3, relay contacts R56d are closed (see Fig. 10b) and two more impulses are sent to the relays SR1 and SR2 through contacts CC24 and CC25 to advance the relays to their 4 positions. The points in the cycles 2 and 3 where these four steps occur are indicated in dotted lines in Figs. 10a and 10b. Finally near the end of Cycle 3 contacts CC5, through R51b, effect a fifth impulse to advance the relays SR1 and SR2 to their 5 positions.

Referring now to Fig. 1n, relays R70 control contacts R70f related to the 8 and 10 positions so that, as for contacts R70e, both the 8 and 10 contacts will be shifted for the three place divisor used as an example. In the cases where interpolating is to be eliminated, one or the other of the 8 and 10 contacts R70f will remain in the position shown in Fig. 1n near the end of Cycle 2 so that when relay contacts R56e close at such time there will be no circuit completed to energize relay R63 (see Fig. 10a). Instead, relay R61 will be energized through a circuit from wire 504 (running to line 382) contacts R56e, either of the upper contacts R70f, and relay R61 to line 381.

Relay R61 shifts its contacts R61a so that during the Cycle 3, the dividend amount in the SP accumulator will be transferred to the MC1 and MC2 accumulator instead of the divisor amount through circuits already traced. Thus Cycle 3 is modified to effect the entries of Cycle 26 and thereafter Cycles 27 to 30 follow to multiply the dividend by the selected reciprocal of the divisor and punch the quotient with appropriate columnar displacement.

Summary

Dividing is carried out by multiplying the dividend by the reciprocal of the divisor and for this purpose a series of reciprocals are preset in the machine for each of the numbers 1.0 to 9.9. The position of the decimal point is taken care of in the ultimate answer depending upon the number of places in the divisor. Thus if the divisor is 1.1 the reciprocal is .909090; if it is .11 the reciprocal is 9.09090 and if it is 11 the reciprocal is .0909090.

When the exact reciprocal of a given divisor is included in the preset series, the reciprocal is entered into the MP device and the dividend is entered into the MC device and a multiplying operation takes place to obtain the quotient in the result accumulator LH from which punching takes place with proper allocation of the decimal point. The multiplying mechanism is of the so-called multiples of the multiplicand type and includes the MP, MC, LH and RH accumulators. The multiplying mechanism employed may of course be of other known forms and the operations represented in Fig. 8 as occurring from Cycles 3 to 6 may generally be designated as operations performed by the multiplying mechanism.

Thus where the exact reciprocal is obtainable directly from the R1.0 to R9.9 relays it may be stated that this reciprocal and the dividend are entered into the multiplying mechanism and the result or quotient obtained thereby in the result accumulator LH.

Where the exact reciprocal is not directly obtainable, there is a selection made of the nearest lower reciprocal and entered into a computing mechanism together with the divisor to obtain a new reciprocal that approaches the exact reciprocal of the divisor. This computing mechanism includes the multiplying mechanism and the devices for handling entry of an 8 in the ninth order of the RH accumulator together with the sequencing controls involved in cycles 3 to 10 wherein the operations called for by the iteration formula are carried out to obtain .834710 for the example shown.

This approximate reciprocal is tested to ascertain its degree of approximation, i. e., whether it is correct to six places and if it is that close, it is entered into the multiplying mechanism together with the dividend to obtain the quotient.

If it does not reach the required degree of accuracy it is reentered into the computing mechanism together with the divisor and the operations of Cycles 3 to 10 are repeated in Cycles 11 to 17 resulting in a closer approximation. This repeated operation of the computing mechanism continues until the desired degree of accuracy is reached.

In the preferred form of machine disclosed, the same multiplying mechanism is employed to multiply the dividend and the ultimate reciprocal as is employed to compute the approximate reciprocal and it will be appreciated that these mechanisms may be entirely separate if so desired. The computing mechanism for obtaining the approximate reciprocal is also not limited to the exact devices illustrated but may be varied as for example known devices might be employed to effect a direct subtraction of 2 instead of the expedient of adding an 8 and then complementing to 10.

Since the specific form of multiplying mechanism and the specific form of computing mechanism are not deemed novel per se, they are broadly recited in the following claims and where so recited they will be deemed to include the components as hereinabove set forth.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a dividing machine, means settable to represent a divisor, means settable to represent a dividend, a series of reciprocal representing devices, one for each of a series of possible divisors, multiplying mechanism having factor and product representing devices, means controlled by the divisor settable means for selecting from said series of reciprocal representing devices the one corresponding to the two highest significant orders of the divisor, computing mechanism comprising multiplying and cross-adding mechanism, means for entering therein the selected reciprocal and the divisor, said computing mechanism including a result manifesting device in which said multiplying and cross-adding mechanisms build up the selected reciprocal to the value of the true reciprocal of the divisor, means for ascertaining when the computed reciprocal has been built up to a desired degree of proximity to the true reciprocal and means controlled thereby for causing entry of the computed reciprocal and the dividend into said multiplying mechanism and for causing an operation thereof to obtain the quotient of the entered factors.

2. In a dividing machine, means settable to represent a divisor, means settable to represent a dividend, a series of reciprocal representing devices, one for each of a series of possible divisors, multiplying mechanism having factor and product representing devices, means controlled by the divisor settable means for selecting from said series of reciprocal representing devices the one corresponding to the two highest significant orders of the divisor, computing mechanism comprising multiplying and cross-adding mechanisms, means for entering therein the selected reciprocal and the divisor, said computing mechanism including a result manifesting device in which said multiplying and cross-adding mechanisms build up the selected reciprocal to obtain a reciprocal more proximate to the true reciprocal of the divisor, means for repeatedly operating said computing mechanism with the previously obtained approximate reciprocal being reentered into the computing mechanism to obtain successively closer reciprocals, means for ascertaining whether the computed reciprocal has been built up to a desired degree of proximity to the true reciprocal for each computed reciprocal and means controlled by said ascertaining means when a predetermined degree of proximity is found, for causing interruption of the repeated operation of the computing mechanism, for causing entry of the last computed reciprocal and the dividend into said multiplying mechanism and for causing an operation thereof to obtain the quotient of the entered factors.

3. In a dividing machine, means settable to represent a divisor, means settable to represent a dividend, a plurality of reciprocal representing devices one for each of the numbers 10 to 99 inclusive, means for ascertaining the number of significant orders in the divisor, multiplying mechanism including factor and product representing devices, means controlled by said ascertaining means for causing said reciprocal representing devices to enter into one of said factor representing devices the reciprocal corresponding to the two highest significant orders of the divisor when the divisor has more than one significant order, or the reciprocal corresponding to ten times the divisor when it has only one significant order and for causing entry of the dividend in another factor representing device, and means for effecting an operation of the multiplying mechanism to obtain the product of the dividend and the selected reciprocal in the product representing device.

4. In a machine of the class described, a set of units order relays, a set of tens order relays, the first set having 10 relays for the digits 0, 1, 2 . . . 9 and the second set having 9 relays for the digits 1, 2 . . . 9, means for sensing a record card for a divisor amount, an entry receiving device controlled thereby to receive the amount sensed, a plurality of relays also controlled by said sensing means to energize a number thereof in accordance with the number of significant digits in the divisor amount, and means controlled jointly by said entry receiving device and said plurality of relays for energizing said sets of units and tens order relays in accordance with the two highest significant orders of the divisor when the divisor has more than one order or in accordance with ten times the divisor when the divisor has only one order.

5. In a machine of the class described, a set of units order relays, a set of tens order relays, the first set having 10 relays for the digits 0, 1, 2 . . . 9 and the second set having 9 relays for the digits 1, 2 . . . 9, means for sensing a record card for a divisor amount, an entry receiving device controlled thereby to receive the amount sensed, a plurality of relays also controlled by said sensing means to energize a number thereof in accordance with the number of significant digits in the divisor amount, means controlled jointly by said entry receiving device and said plurality of relays for energizing said sets of units and tens order relays in accordance with the two highest significant orders of the divisor when the divisor has more than one order or in accordance with ten times the divisor when the divisor has only one order, a set of reciprocal relays one for each of the amounts 10 to 99 and circuit connections established jointly by said ordered sets of relays for energizing the one of said set of reciprocal relays corresponding to the value set up on the said ordered sets of relays.

6. In a dividing machine, means settable to represent any one or two place divisor, means settable to represent a dividend, a series of reciprocal representing devices, one for each of a series of possible two place divisors, means for ascertaining whether the divisor is a one or a two place number, means controlled thereby and by the divisor settable means for selecting from said series of reciprocal representing devices, the one corresponding to the divisor when the divisor is a two place number, or the one corresponding to ten times the divisor when the divisor is a single digit, multiplying mechanism having factor and product representing devices, and means for causing said selected reciprocal device and said dividend settable means to jointly control the operation of the multiplying mechanism to obtain the quotient of the dividend and divisor in the product representing device of the multiplying mechanism.

FRANCIS E. HAMILTON.
BENJAMIN M. DURFEE.

REFERENCES CITED

The following references are of record in the file of this patent:

UNITED STATES PATENTS

| Number | Name | Date |
|---|---|---|
| 2,090,103 | Bryce | Aug. 17, 1937 |
| 2,113,229 | Bryce | Apr. 5, 1938 |
| 2,165,220 | Bryce et al. | July 11, 1939 |
| 2,217,196 | Bryce et al. | Oct. 8, 1940 |
| 2,237,150 | Kolm | Apr. 1, 1941 |